United States Patent
Bellan et al.

(10) Patent No.: US 10,454,762 B2
(45) Date of Patent: **\*Oct. 22, 2019**

(54) SYSTEM AND METHOD OF PROCESSING MEDIA TRAFFIC FOR A HUB-BASED SYSTEM FEDERATING DISPARATE UNIFIED COMMUNICATIONS SYSTEMS

(71) Applicant: NextPlane, Inc., Sunnyvale, CA (US)

(72) Inventors: Saravanan Bellan, San Jose, CA (US); Sanjay M. Pujare, San Jose, CA (US); Yogesh Raina, Cupertino, CA (US); Farzin Khatib Shahidi, Los Altos Hills, CA (US); Silvia Restelli, San Jose, CA (US)

(73) Assignee: Nextplane, Inc., Sunnyvale, CA (US)

(\*) Notice: Subject to any disclaimer, the term of this patent is extended or adjusted under 35 U.S.C. 154(b) by 62 days.

This patent is subject to a terminal disclaimer.

(21) Appl. No.: 15/658,143

(22) Filed: Jul. 24, 2017

(65) Prior Publication Data
US 2017/0324613 A1    Nov. 9, 2017

Related U.S. Application Data

(63) Continuation of application No. 14/705,927, filed on May 6, 2015, now Pat. No. 9,716,619, which is a
(Continued)

(51) Int. Cl.
*H04L 12/24* (2006.01)
*H04L 12/58* (2006.01)
(Continued)

(52) U.S. Cl.
CPC ......... *H04L 41/0806* (2013.01); *H04L 51/36* (2013.01); *H04L 63/104* (2013.01);
(Continued)

(58) Field of Classification Search
CPC .... H04L 12/5835; H04L 29/06; H04L 51/066
See application file for complete search history.

(56) References Cited

U.S. PATENT DOCUMENTS

| 5,784,612 A | | 7/1998 | Crane |
| 6,041,281 A | \* | 3/2000 | Nimura ............. G01C 21/3682 340/988 |

(Continued)

FOREIGN PATENT DOCUMENTS

| EP | 1549024 A1 | 6/2005 |
| EP | 2587721 A1 | 5/2013 |

(Continued)

OTHER PUBLICATIONS

Cisco Unified Communications System Description Release 8.5(1), Cisco Systems, Inc., San Jose, CA, (c) 2010, 90 pages.
(Continued)

*Primary Examiner* — Ranodhi Serrao
(74) *Attorney, Agent, or Firm* — Goodwin Procter LLP

(57) ABSTRACT

A system and method of processing media traffic for a hub-based system federating disparate unified communications systems is disclosed. According to one embodiment, a system includes a federation server that is configured to connect to a first unified communications system and a second unified communications system, where the federation server receives a media call initiation request from a first client of the first unified communications system, where the media call initiation request initiates a media call with a second client of the second unified communications system, and where the federation server provides a uniform resource locator to the second client based on the media initiation request, wherein the uniform resource locator is configured to direct a user on the second client to a browser to accept the media call.

20 Claims, 23 Drawing Sheets

Related U.S. Application Data continuation-in-part of application No. 13/077,710, filed on Mar. 31, 2011, now Pat. No. 9,077,726.

(51) Int. Cl.
*H04L 29/06* (2006.01)
*H04L 29/08* (2006.01)
*H04L 29/12* (2006.01)

(52) U.S. Cl.
CPC ........ *H04L 65/103* (2013.01); *H04L 65/1006* (2013.01); *H04L 65/60* (2013.01); *H04L 67/141* (2013.01); *H04L 51/066* (2013.01); *H04L 61/2575* (2013.01); *H04L 61/2589* (2013.01)

(56) References Cited

U.S. PATENT DOCUMENTS

| | | | |
|---|---|---|---|
| 6,065,016 A * | 5/2000 | Stuntebeck | H04M 3/4931 |
| 6,192,405 B1 | 2/2001 | Bunnell | |
| 6,208,986 B1 * | 3/2001 | Schneck | G06F 17/3089 |
| 6,298,128 B1 * | 10/2001 | Ramey | H04M 3/5307 379/142.01 |
| 6,418,200 B1 * | 7/2002 | Ciccolella | H04M 3/4931 379/201.02 |
| 6,463,056 B1 * | 10/2002 | Silva | H04L 29/06 370/356 |
| 6,591,291 B1 | 7/2003 | Gabber | |
| 6,654,759 B1 | 11/2003 | Brunet | |
| 6,665,378 B1 | 12/2003 | Spielman | |
| 6,738,462 B1 | 5/2004 | Brunson | |
| 6,892,245 B1 | 5/2005 | Crump | |
| 6,970,553 B1 | 11/2005 | Gao | |
| 7,051,114 B1 | 5/2006 | Ravishankar | |
| 7,269,432 B2 | 9/2007 | Gress | |
| 7,350,229 B1 | 3/2008 | Lander | |
| 7,376,827 B1 | 5/2008 | Jiao | |
| 7,383,436 B2 | 6/2008 | Srivastava | |
| 7,443,961 B2 | 10/2008 | Schroeder | |
| 7,558,827 B2 | 7/2009 | Kawashima | |
| 7,577,132 B2 | 8/2009 | Katz | |
| 7,697,924 B2 | 4/2010 | Caspi | |
| 7,698,398 B1 | 4/2010 | Lai | |
| 7,706,266 B2 | 4/2010 | Plamondon | |
| 7,739,333 B2 | 6/2010 | Serr | |
| 7,953,979 B2 | 5/2011 | Borneman | |
| 8,117,276 B1 | 2/2012 | Sakata | |
| 8,145,719 B2 | 3/2012 | Barman | |
| 8,200,758 B2 | 6/2012 | Serr | |
| 8,359,357 B2 | 1/2013 | Rodriguez | |
| 8,380,661 B2 | 2/2013 | Richards | |
| 8,970,553 B2 | 3/2015 | Park | |
| 9,077,726 B2 | 7/2015 | Pujare | |
| 9,203,799 B2 | 12/2015 | Bellan | |
| 9,241,012 B2 | 1/2016 | De Castro, Jr. | |
| 2002/0023152 A1 | 2/2002 | Oguchi | |
| 2002/0037074 A1 * | 3/2002 | Dowens | H04L 12/1813 379/88.14 |
| 2002/0083183 A1 * | 6/2002 | Pujare | G06F 8/65 709/231 |
| 2002/0087704 A1 * | 7/2002 | Chesnais | H04L 29/06 709/228 |
| 2002/0124057 A1 * | 9/2002 | Besprosvan | H04L 29/06 709/219 |
| 2002/0147927 A1 | 10/2002 | Tait | |
| 2002/0157089 A1 * | 10/2002 | Patel | G06F 8/65 717/178 |
| 2003/0018725 A1 * | 1/2003 | Turner | H04L 51/04 709/206 |
| 2003/0149781 A1 | 8/2003 | Yared | |
| 2004/0052356 A1 | 3/2004 | McKinzie | |
| 2004/0083297 A1 | 4/2004 | Gazzetta | |
| 2004/0098615 A1 | 5/2004 | Mowers | |
| 2005/0022006 A1 | 1/2005 | Bass | |
| 2005/0047238 A1 | 3/2005 | Castagnetti | |
| 2005/0047438 A1 | 3/2005 | Sylvain | |
| 2005/0097317 A1 | 5/2005 | Trostle | |
| 2005/0102513 A1 | 5/2005 | Alve | |
| 2005/0175021 A1 | 8/2005 | Ozugur | |
| 2005/0288961 A1 | 12/2005 | Tabrizi | |
| 2006/0021017 A1 | 1/2006 | Hinton | |
| 2006/0021019 A1 | 1/2006 | Hinton | |
| 2006/0053384 A1 | 3/2006 | La Fetra, Jr. | |
| 2006/0075506 A1 | 4/2006 | Sanda | |
| 2006/0120362 A1 | 6/2006 | Westman | |
| 2006/0128409 A1 | 6/2006 | Gress | |
| 2006/0136990 A1 | 6/2006 | Hinton | |
| 2006/0205434 A1 | 9/2006 | Tom | |
| 2006/0230124 A1 | 10/2006 | Belfiore | |
| 2007/0011245 A1 | 1/2007 | Kawashima | |
| 2007/0130343 A1 | 6/2007 | Pardo-Blazquez | |
| 2007/0136603 A1 | 6/2007 | Kuecuekyan | |
| 2007/0202897 A1 | 8/2007 | Smith | |
| 2007/0234417 A1 | 10/2007 | Blakley, III | |
| 2007/0285503 A1 | 12/2007 | Asthana | |
| 2008/0010665 A1 | 1/2008 | Hinton | |
| 2008/0016195 A1 | 1/2008 | Tulshibagwale | |
| 2008/0021997 A1 | 1/2008 | Hinton | |
| 2008/0032695 A1 | 2/2008 | Zhu | |
| 2008/0072301 A1 | 3/2008 | Chia | |
| 2008/0082662 A1 | 4/2008 | Dandliker | |
| 2008/0086465 A1 | 4/2008 | Fontenot | |
| 2008/0086564 A1 | 4/2008 | Putman | |
| 2008/0133729 A1 | 6/2008 | Fridman | |
| 2008/0144896 A1 | 6/2008 | Burke | |
| 2008/0215694 A1 | 9/2008 | Chen | |
| 2008/0215717 A1 | 9/2008 | Zhou | |
| 2008/0219223 A1 | 9/2008 | Bienas | |
| 2008/0320576 A1 | 12/2008 | Curling | |
| 2009/0006076 A1 | 1/2009 | Jindal | |
| 2009/0019115 A1 | 1/2009 | Larson | |
| 2009/0019367 A1 | 1/2009 | Cavagnari | |
| 2009/0049190 A1 | 2/2009 | Jiang | |
| 2009/0049202 A1 | 2/2009 | Pattison | |
| 2009/0077251 A1 | 3/2009 | Brown | |
| 2009/0089625 A1 | 4/2009 | Kannappan | |
| 2009/0094336 A1 | 4/2009 | Echevarria | |
| 2009/0100289 A1 | 4/2009 | Chen | |
| 2009/0119763 A1 | 5/2009 | Park | |
| 2009/0138615 A1 | 5/2009 | Cristallo | |
| 2009/0150905 A1 | 6/2009 | Lin | |
| 2009/0172776 A1 | 7/2009 | Makagon | |
| 2009/0177735 A1 | 7/2009 | Algie | |
| 2009/0180602 A1 | 7/2009 | Ramanathan | |
| 2009/0210496 A1 | 8/2009 | Shaffer | |
| 2009/0276840 A1 | 11/2009 | Cao | |
| 2009/0292814 A1 | 11/2009 | Ting | |
| 2009/0307327 A1 | 12/2009 | Malik | |
| 2009/0319672 A1 | 12/2009 | Reisman | |
| 2009/0327419 A1 | 12/2009 | Serr | |
| 2009/0327441 A1 | 12/2009 | Lee | |
| 2009/0327511 A1 | 12/2009 | Kim | |
| 2009/0327868 A1 | 12/2009 | Tsukikawa | |
| 2010/0017598 A1 | 1/2010 | Rodriguez | |
| 2010/0057851 A1 | 3/2010 | Ionescu | |
| 2010/0058120 A1 | 3/2010 | Coleman | |
| 2010/0100925 A1 | 4/2010 | Hinton | |
| 2010/0162374 A1 | 6/2010 | Nair | |
| 2010/0205664 A1 | 8/2010 | Serr | |
| 2010/0223334 A1 | 9/2010 | Narayanan | |
| 2010/0251158 A1 | 9/2010 | Geppert | |
| 2010/0287226 A1 | 11/2010 | Wright | |
| 2010/0290611 A1 | 11/2010 | Ramanathan | |
| 2011/0035443 A1 | 2/2011 | Jensen | |
| 2011/0138028 A1 | 6/2011 | Katz | |
| 2011/0179180 A1 | 7/2011 | Schleifer | |
| 2011/0231473 A1 | 9/2011 | Narayanan | |
| 2011/0231919 A1 | 9/2011 | Vangpat | |
| 2011/0238761 A1 | 9/2011 | Mizokami | |
| 2011/0252091 A1 | 10/2011 | Chitturi | |
| 2011/0258159 A1 | 10/2011 | Mitchell | |
| 2011/0271332 A1 | 11/2011 | Jones | |
| 2011/0304686 A1 | 12/2011 | Qiu | |

(56) References Cited

U.S. PATENT DOCUMENTS

| | | |
|---|---|---|
| 2011/0314014 A1 | 12/2011 | Junginger |
| 2012/0008753 A1 | 1/2012 | Burnett |
| 2012/0036566 A1 | 2/2012 | Nicholson |
| 2012/0084254 A1 | 4/2012 | Richards |
| 2012/0096271 A1 | 4/2012 | Ramarathinam |
| 2012/0163577 A1 | 6/2012 | Buford |
| 2012/0180105 A1 | 7/2012 | Downes |
| 2012/0185391 A1 | 7/2012 | Sirota |
| 2012/0190325 A1 | 7/2012 | Abu-Hakima |
| 2012/0203913 A1 | 8/2012 | Pujare |
| 2012/0216267 A1 | 8/2012 | Austel |
| 2012/0216268 A1 | 8/2012 | Kassaei |
| 2012/0254326 A1 | 10/2012 | Bellan |
| 2012/0254373 A1 | 10/2012 | Pujare |
| 2012/0274725 A1 | 11/2012 | Robertson |
| 2012/0291089 A1 | 11/2012 | Bomgardner |
| 2012/0303672 A1 | 11/2012 | Anand |
| 2012/0314635 A1 | 12/2012 | Lee |
| 2013/0007150 A1 | 1/2013 | Hertz |
| 2013/0065618 A1 | 3/2013 | Long |
| 2013/0066871 A1 | 3/2013 | Fletcher |
| 2013/0066976 A1 | 3/2013 | Massey |
| 2013/0067365 A1 | 3/2013 | Shrufi |
| 2013/0132285 A1 | 5/2013 | Richards |
| 2013/0132547 A1 | 5/2013 | Reed |
| 2013/0151709 A1 | 6/2013 | Luna |
| 2013/0160105 A1 | 6/2013 | Huang |
| 2013/0198386 A1 | 8/2013 | Srikanth |
| 2013/0246640 A1 | 9/2013 | Ahrens |
| 2013/0254847 A1 | 9/2013 | Adams |
| 2013/0268920 A1 | 10/2013 | Ursal |
| 2014/0089348 A1 | 3/2014 | Vollmert |
| 2014/0148934 A1 | 5/2014 | Manley |
| 2014/0181255 A1 | 6/2014 | Thomas |
| 2014/0280931 A1 | 9/2014 | Braun |
| 2014/0280932 A1 | 9/2014 | Braun |
| 2014/0282816 A1 | 9/2014 | Xie |
| 2014/0282934 A1 | 9/2014 | Miasnik |
| 2014/0289303 A1 | 9/2014 | Tarricone |
| 2014/0337954 A1 | 11/2014 | Ahmed |
| 2014/0350927 A1 | 11/2014 | Yamabe |
| 2014/0359027 A1 | 12/2014 | Pujare |
| 2015/0032700 A1 | 1/2015 | Mermelstein |
| 2015/0039700 A1 | 2/2015 | West |
| 2015/0074788 A1 | 3/2015 | Wang |
| 2015/0237041 A1 | 8/2015 | Flamini |

FOREIGN PATENT DOCUMENTS

| | | |
|---|---|---|
| WO | 2002039237 A2 | 5/2002 |
| WO | 2015054522 A1 | 4/2015 |

OTHER PUBLICATIONS

Converged Address Book Architecture; OMA-AD-CAB-V1_0-20110907-D, No. 1.0, (Sep. 7, 2011), pp. 1-24, OMA-AD-CAB-V1_0-20110907-D, Open Mobile Alliance (OMA), 4330 La Jolla Village Dr., Suite 110 San Diego, CA 92122 ; USA, URL: ftp/Public_documents/COM/COM-CAB-M/Permanent_documents/, (Oct. 19, 2012), XP064143354.

Nimsoft® Monitor Server, Getting Started Guide version 6.00 (Jun. 29, 2012 to Nimsoft), 46 pages.

Office-LinX Cloud Connect Edition for Cisco Unity Connection, Esna Technologies, Inc., Richmond Hill, ON, Canada D 2012, 2 pages.

Representational state transfer, Wikipedia, downloaded from en.wikipedia.org/wiki/Representational_state_transfer pn Feb. 2, 2015, pp. 1-7.

Web Application Description Language, Wikipedia, downloaded from en.wikipedia.org/wiki/web_Application_Description_Language on Feb. 2, 2015, pp. 1-3.

Chapter 21—Voice Messaging, Cisco Unified Communications System Description—Release 9.0 SRND, Cisco Systems, Inc., San Jose, CA, Apr. 30, 2013, 44 pages.

Beuchelt, G., et al., "RESTful Services Guidance for Developers v 1.0", Mitre Technical Report MTR100093, Apr. 2010, 46 pages.

Bogusz, Dariusz, et al., "Telco 2.0 for UC—an example of integration telecommunications service provider's SDP with anterprise UC system", FedCSIS 2012, Wroclaw, Poland, Sep. 9-12, 2012, pp. 603-606.

Bossoli, et al; "Proposal for Common Interoperability Protocol", Online, Aug. 30, 2003, pp. 1-3, XP002283230.

Ennai, Anuraj, et al., "MobileSOA: A Service Oriented Web 2.0 Framework for Context-Aware, Lightweight and Flexible Mobile Applications", EDOCW 2008, Munich, Germany, Sep. 16, 2008, pp. 345-352.

Fatna Belqasmi et al, "A Peer to Peer Architecture for Enabling a Universal Presence Service", Next Generation Mobile Applications, Services and Technologies (NGMAST), 2010 Fourth International Conference on, IEEE, Piscataway, NJ, USA, (Jul. 27, 2010), ISBN 978-1-4244-7649-7, pp. 90-95, XP031739645.

International Search Report and Written Opinion for Application No. PCT/US12/24014, dated May 23, 2012, 8 pp.

Jorgen Thelin, Microsot Tech ed IT Professional 2008 Presentation, Jan. 14, 2009, https://www.slideshare.net/jthelin/rnicrosoft-services-connector-connecting-active-directory-to-cloud-service-presentation, pp. 1-25.

Levy, Brian, "The common capability approach to new service development", BT Technology Journal, vol. 23, No. 1, Jan. 2005, pp. 48-54.

Microsoft Computer Dictionary, 5th Edition, Microsoft Press Redmond, WA, (c) 2002, p. 474.

Microsoft Computer Dictionary, 5th Edition, Microsoft Press, Redmond, WA, (c) 2002, p. 16.

PCT International Search Report dated Oct. 22, 2014 in corresponding PCT Application No. PCT/US2014/041595 filed Jun. 9, 2014, inventor Pujare, Sanjay et al.

PCT International Search Report dated Apr. 6, 2015 in corresponding PCT Application No. PCT/US2014/049827 filed Aug. 5, 2014, inventor Pujare, Sanjay et al.

PCT International Search Report dated Jan. 2, 2015 in corresponding PCT Application No. PCT/US2014/059944 filed Oct. 9, 2014, inventor Pujare, Sanjay et al.

PCT International Search Report dated Aug. 26, 2016 in corresponding PCT Application No. PCT/US2016/031330 filed May 6, 2016, inventor Bellan, Saravanan et al.

PCT International Search Report dated Aug. 5, 2016 in corresponding PCT Application No. PCT/US2016/031304 filed May 6, 2016, inventor Bellan, Saravanan et al.

PCT International Search Report dated Jul. 28, 2015 in corresponding PCT Application No. PCT/US14/40711 filed Jun. 3, 2014, inventor Pujare, Sanjay et al.

PCT International Search Report dated Jul. 8, 2011 in corresponding PCT Application No. PCT/US11/34009 filed Apr. 26, 2011, inventor Pujare, Sanjay et al.

PCT International Search Report dated May 23, 2012 in corresponding PCT Application No. PCT/US2012/024014 filed Feb. 6, 2012, inventor Pujare, Sanjay et al., 3 pages.

Supplementary European Search Report dated Aug. 20, 2014 in corresponding EP Application No. EP 11862613 filed Apr. 26, 2011, inventor Pujare, Sanjay et al., 2 pages.

Technical Specification "Interdomain Federation for IM and Presence Service on Cisco Unified Communications Manager, Release 9.0(1)", Cisco Systems, Inc., San Jose, CA, Jul. 18, 2012, 188 pages.

Yeh, Yi-Shiung, et al., "Applying lightweight directory access protocol service on session certification authority", Computer Networks, vol. 38, Issue 5, Apr. 2002, pp. 675-692.

\* cited by examiner

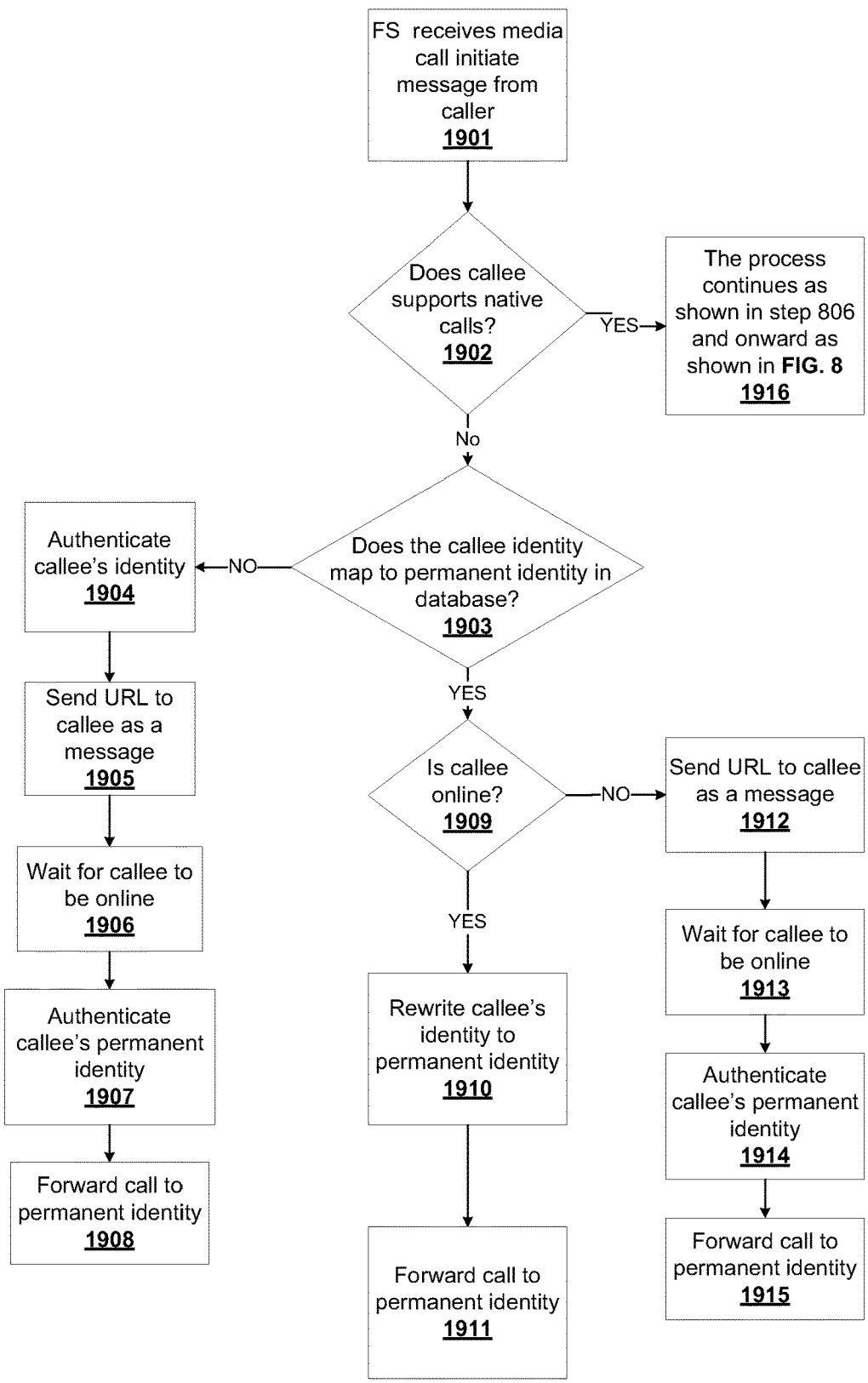
FIG. 19A (Incoming Mode)

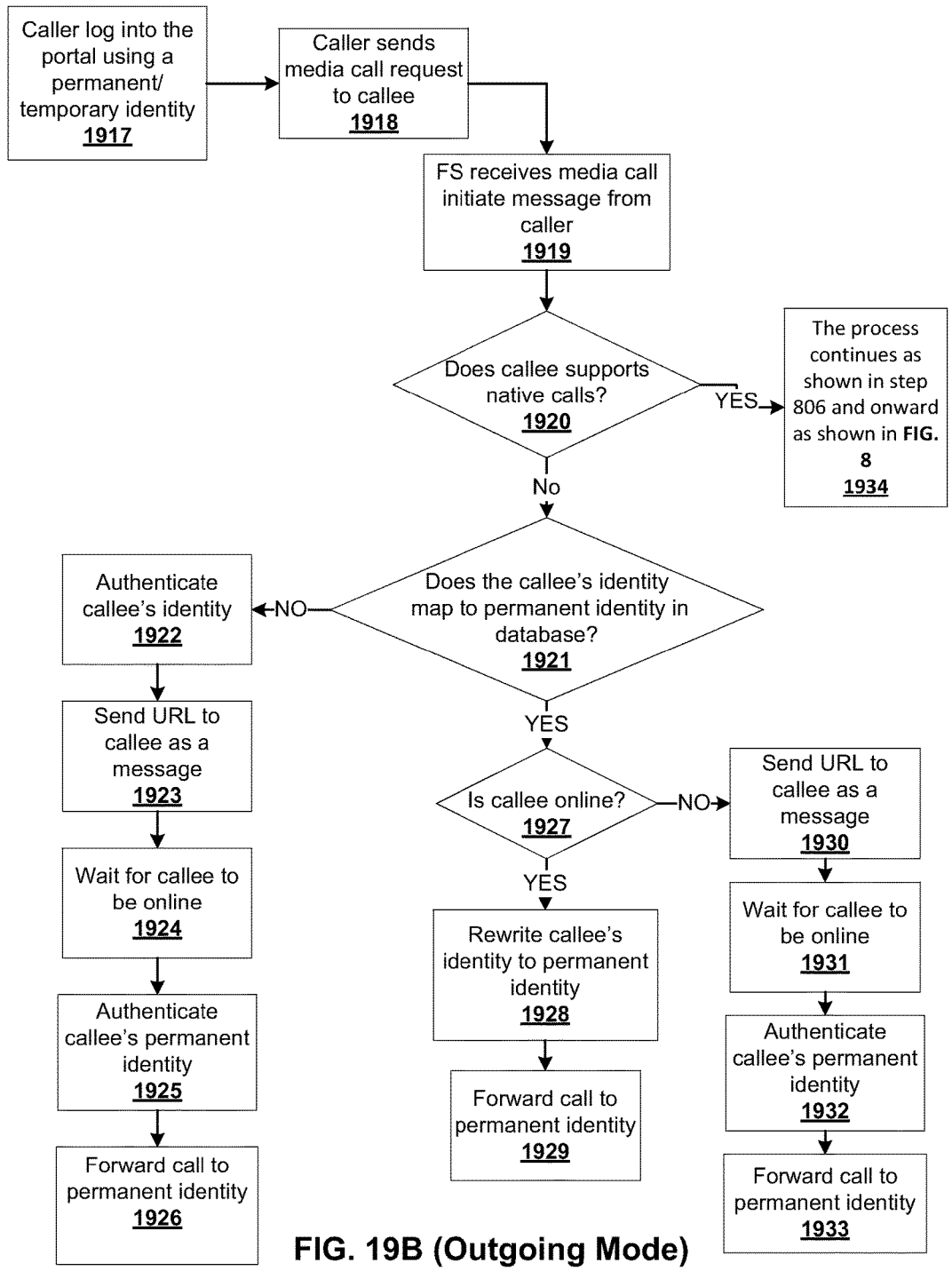
FIG. 19B (Outgoing Mode)

SYSTEM AND METHOD OF PROCESSING MEDIA TRAFFIC FOR A HUB-BASED SYSTEM FEDERATING DISPARATE UNIFIED COMMUNICATIONS SYSTEMS

This application is a continuation of U.S. application Ser. No. 14/705,927, titled "System And Method Of Processing Media Traffic For A Hub-Based System Federating Disparate Unified Communications Systems" filed on May 6, 2015, which is a continuation-in-part of U.S. patent application Ser. No. 13/077,710 titled "Hub Based Clearing House for Interoperability of Distinct Unified Communications Systems," filed on Mar. 31, 2011, issued on Jul. 7, 2015 as U.S. Pat. No. 9,077,726 both which are fully incorporated herein by reference.

FIELD

The present disclosure relates in general to unified communications (UC) systems. In particular, the present disclosure relates to a system and method of processing media traffic for a hub-based system federating disparate unified communications systems.

BACKGROUND

A unified communications (UC) system generally refers to a system that provides users with an integration of communications services. Users typically connect to the UC system through a single client to access the integrated communications services. The integrated communications services may include real-time services, such as instant messaging (IM), presence notifications, telephony, and video conferencing, as well as non-real-time services, such as email, SMS, fax, and voicemail.

Organizations, such as corporations, businesses, educational institutions, and government entities, often employ UC systems to enable internal communication among its members in a uniform and generally cost-efficient manner. In addition, organizations may employ UC systems for communicating with trusted external entities.

Currently, a number of third-party developers offer various UC applications for implementing UC systems. The various applications include Microsoft Office Communications Server (OCS), IBM Sametime (ST), Google Apps, and Cisco Jabber. Because there is no industry standard regarding UC systems, issues of incompatibility arise when one UC system needs to communicate with a different UC system. In one case, a corporation or business that employs a particular UC system may desire to communicate externally with vendors or other persons who employ a different UC system. Or in the case of internal communication, when an organization that employs a particular UC system "A" merges with another organization that employs a UC system "B", the ability for users on system "A" to communicate with users on system "B" is often desirable. Nevertheless, the incompatibility of the UC systems often makes communication between the UC systems difficult or impossible to implement.

A system wide shift to one system can be expensive and in some cases impractical. Thus, in the past, these issues have been dealt with in a variety of ways:
1. Using multiple clients. For instance, user A would use client 1 to communicate with users on system 1 and use client 2 to communicate with users on system 2. One drawback to this system is that users who only have access to system 1 still cannot communicate with users who only have access to system 2 and vice versa.
2. Using a multi-protocol client that is capable of talking to multiple UC systems. The user still needs an account on each system.
3. Using a point federation system.
4. Switching the communication mode. That is, if IM is not possible switching to a telephone call or email.
5. Building a custom link.

However, these alternative ways for implementing UC systems are sub-optimal as they typically result in reduced usability or in increasingly unscalable and expensive infrastructure. Furthermore, clients of two UC systems may wish to communicate with one another by media calls (e.g., audio and video calls) and/or by conference calls. However, most UC systems do not support federated calls between clients of different UC systems.

SUMMARY

A system and method of processing media traffic for a hub-based system federating disparate unified communications systems is disclosed. According to one embodiment, a system includes a federation server that is configured to connect to a first unified communications system and a second unified communications system, where the federation server receives a media call initiation request from a first client of the first unified communications system, where the media call initiation request initiates a media call with a second client of the second unified communications system, and where the federation server provides a uniform resource locator to the second client based on the media initiation request, wherein the uniform resource locator is configured to direct a user on the second client to a browser to accept the media call.

The above and other preferred features, including various novel details of implementation and combination of elements, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments.

BRIEF DESCRIPTION OF THE FIGURES

The accompanying figures, which are included as part of the present specification, illustrate the various embodiments of the present disclosed system and method and together with the general description given above and the detailed description of the preferred embodiments given below serve to explain and the teach the principles of the present disclosure.

FIG. 19A illustrates a flow chart of an incoming mode of an exemplary process for initiating a media call between various user types of a UC system, according to one embodiment;

FIG. 19B illustrates a flow chart of an outgoing mode of an exemplary process for initiating a media call between various user types of a UC system, according to one embodiment;

Figure 1:
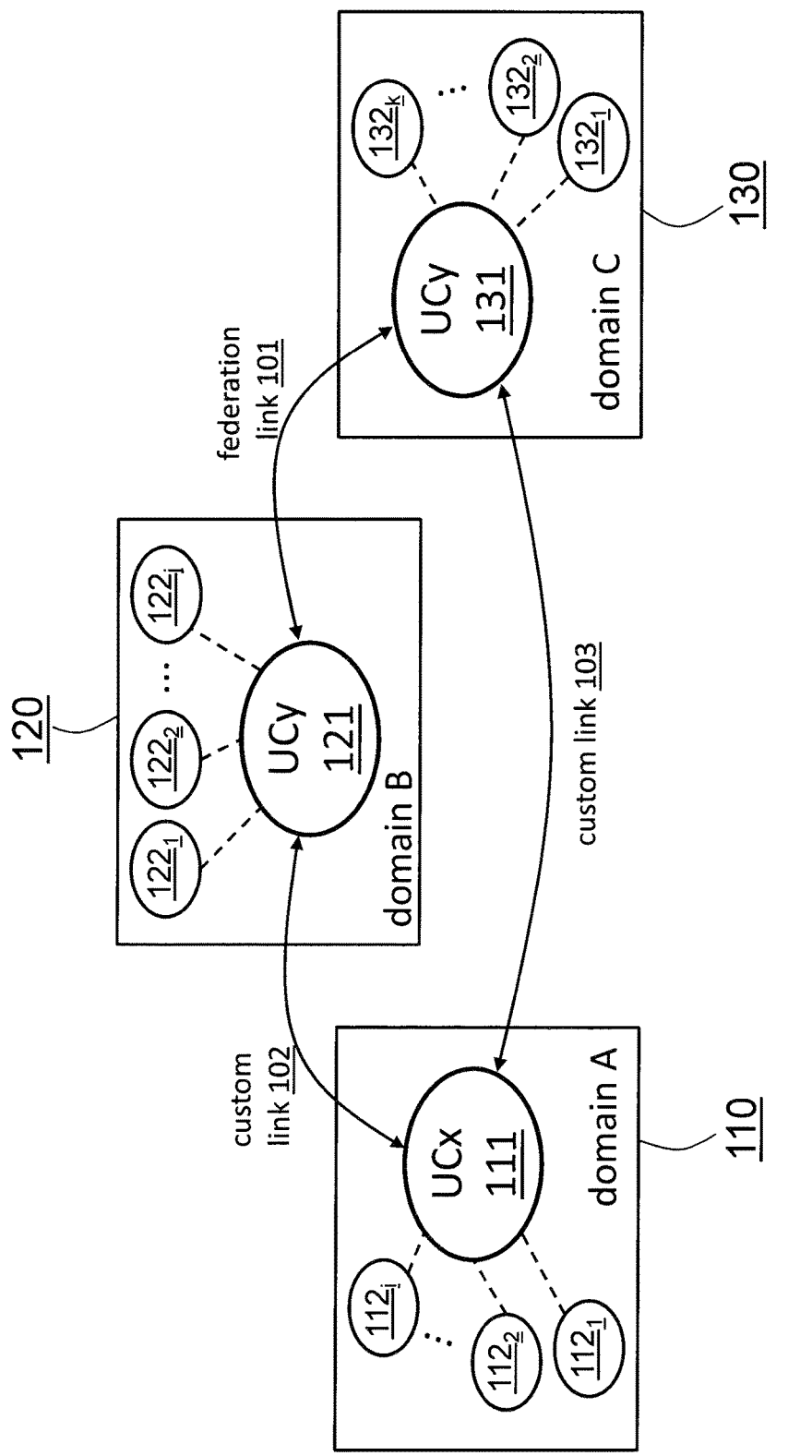
FIG. 1 illustrates a block diagram of a prior art system for interconnecting three UC systems using custom and federation links.

It should be noted that the figures are not necessarily drawn to scale and elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A system and method of processing media traffic for a hub-based system federating disparate unified communications systems is disclosed. According to one embodiment, a system includes a federation server that is configured to connect to a first unified communications system and a second unified communications system, where the federation server receives a media call initiation request from a first client of the first unified communications system, where the media call initiation request initiates a media call with a second client of the second unified communications system, and where the federation server provides a uniform resource locator to the second client based on the media initiation request, wherein the uniform resource locator is configured to direct a user on the second client to a browser to accept the media call. However, in some embodiments, if the second client allow native federated calling, then the call is sent natively instead of the uniform resource locator.

Each of the features and teachings disclosed herein can be utilized separately or in conjunction with other features and teachings to provide a system and method of processing media traffic for a hub-based system federating disparate unified communications systems. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Infrastructure

FIG. 1 illustrates a block diagram of a prior art system for interconnecting three UC systems using custom and federation links. UC system 111 is running the UC application denoted as "UCx" and UC systems 121 and 131 are running a different UC application denoted as "UCy". Each UC system supports a different domain and is accessible (e.g., instant messaging, emailing, videoconferencing, etc.) by its respective set of users in the domain. As such, users $112_1$-$112_i$ in domain A 110 can communicate with one another through UC system 111. Similarly, users $122_1$-$122_j$ in domain B 120 and users $132_1$-$132_k$ in domain C 130 can access UC systems 121 and 131, respectively, to communicate with other users in the same domain. Because a user generally interacts with a UC system through a user client device ("client"), the terms "user" and "client" are used interchangeably in this disclosure.

Issues arise, for instance, when users in domain B 120 need to communicate with users in domain A 110 or users in domain C 130. Without a communications link between users in two different domains, the users in a domain can only communicate (through its UC system) with users in the same domain. Here, as FIG. 1 illustrates, federation link 101 provides a communications link between UC system 120 and 130. A federation link allows users in different domains to communicate with each other so long as the associated UC systems are running the same UC application. In this case, because UC systems 121 and 131 both run UC application "UCy", federation link 101 allows users $122_1$-$122_j$ to communicate with users $132_1$-$132_k$. Whether a federation link is available depends on the particular UC system.

However, where the UC systems are not running the same UC application, as between UC system 111 and UC system 121, there is typically no federation link available because a third-party developer would only provide support for its own product. Historically, one way to provide a communications link between UC systems 111 and 121 is to build a custom link 102, as FIG. 1 illustrates. Custom link 102 includes a translator that translates messages from UC system type "UCx" to UC system type "UCy" and specifically between domains 110 and 120. Because building a custom link is generally expensive in both time and resources, it is not an optimal solution.

Furthermore, custom links are not scalable. As FIG. 1 illustrates, even after a custom link 102 is implemented between domain A 110 and domain B 120, a second custom link 103 would need to be implemented in order for users in domain A 110 to communicate with users in domain C 130. Thus, implementing the infrastructure of FIG. 1 requires three unique communications links.

Figure 2:
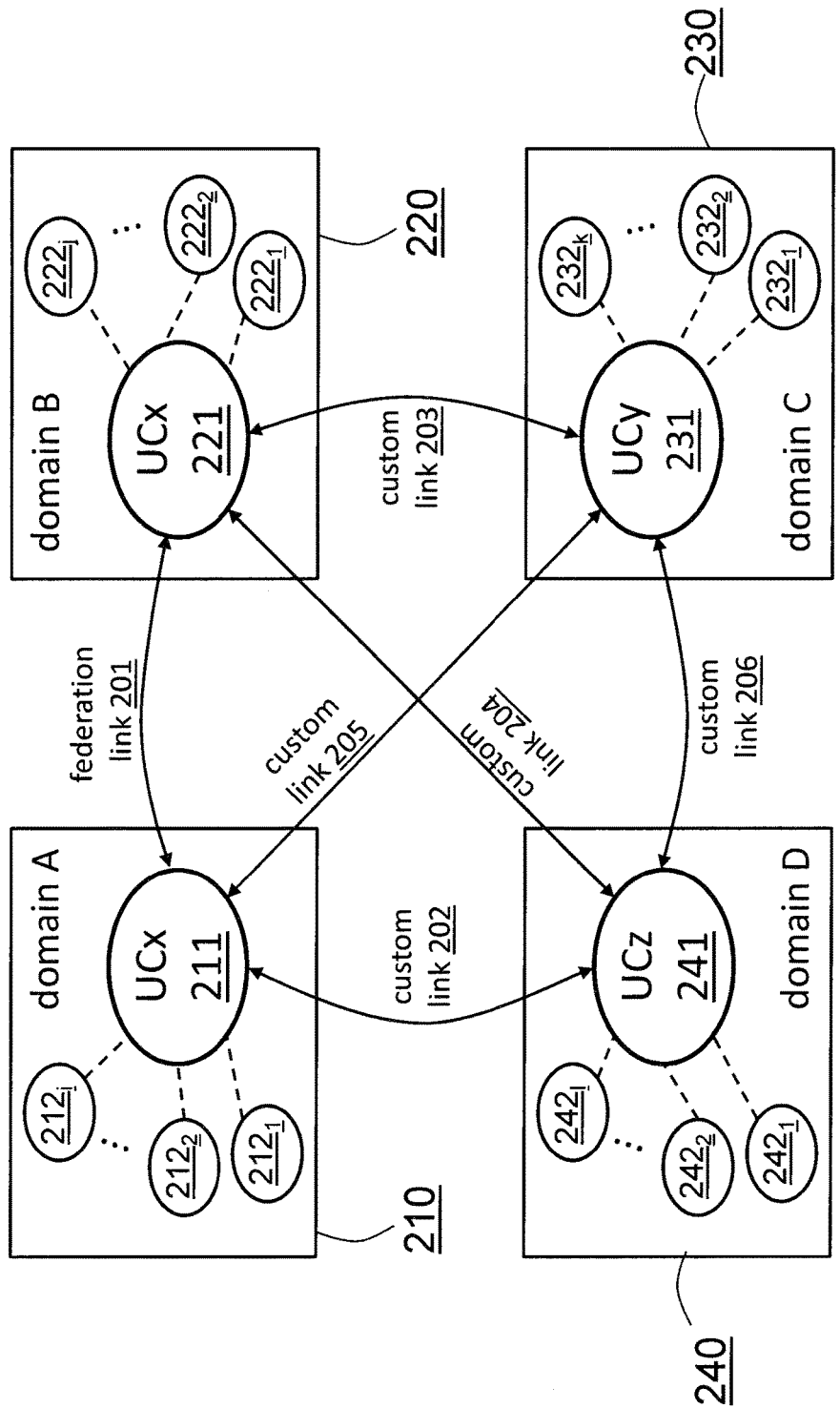
FIG. 2 illustrates a block diagram of a prior art system for interconnecting four UC systems using custom and federation links.

FIG. 2 illustrates a block diagram of a prior art system for interconnecting four UC systems using custom and federation links. As FIG. 2 illustrates, the scaling problem escalates when four UC systems in four different domains are interconnected using custom and federation links. Federation link 201 between UC systems 211 and 221 provides a communications support between users in domain A 210 and users in domain B 220. Federation link 201 is available as both associated UC systems 211 and 221 run the same UC application denoted by "UCx". Because UC systems 231 and 241 each run different UC applications (denoted by "UCy" and "UCz" respectively), the infrastructure of FIG. 2 requires implementing six unique communications links (five custom links 202-206 and one federation link 201) in order for users in any of the four domains to communicate with one another. Thus, the complexity of implementing custom links essentially doubled (from the implementation of FIG. 1 to FIG. 2) by adding just one UC system running a different UC application. As such, infrastructures that employ custom links are not scalable. There exists a need for a highly scalable system for interconnecting distinct and independent UC systems in a federated manner to provide communications support among users of the UC systems.

Figure 3:
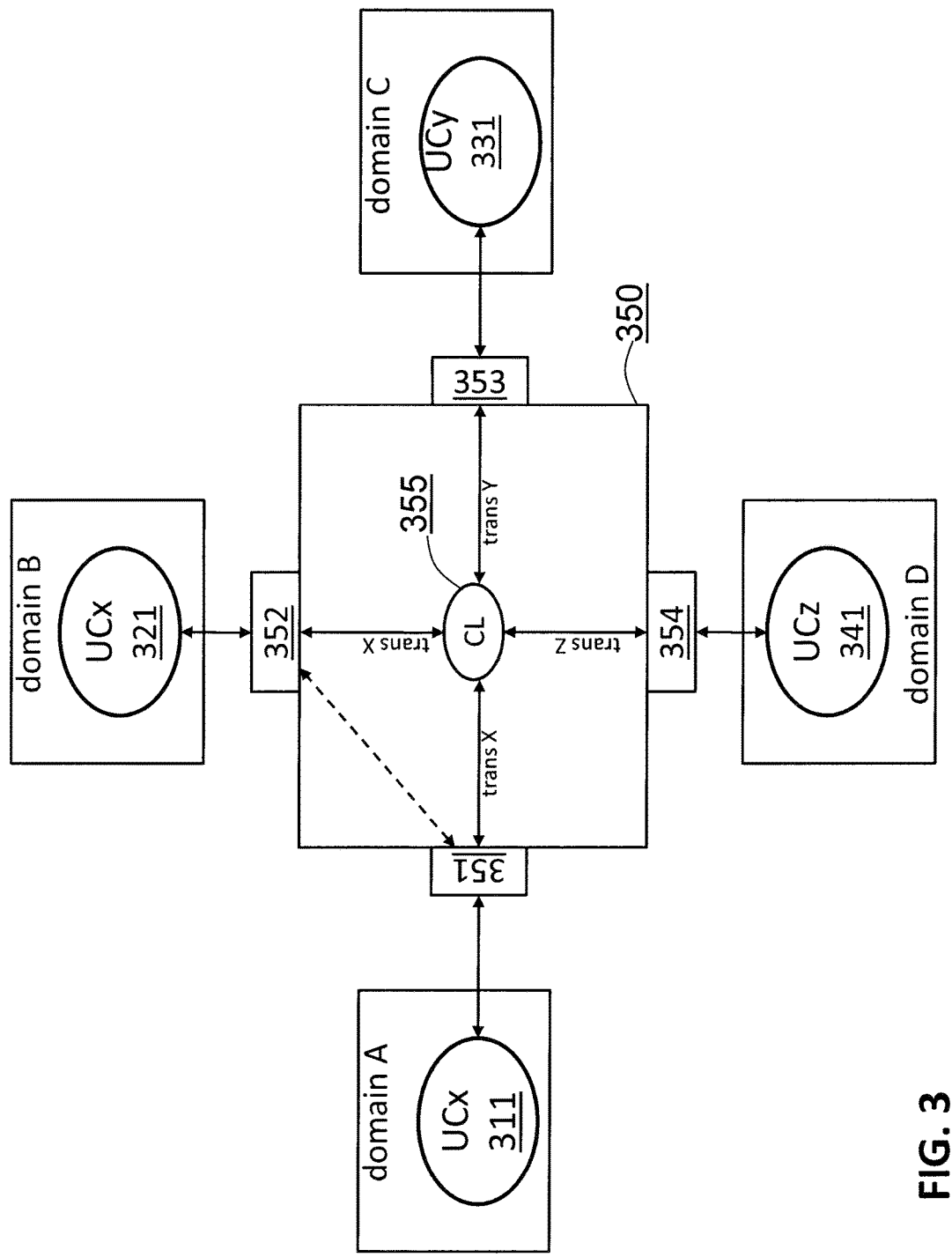
FIG. 3 illustrates a block diagram of an exemplary highly scalable system for interconnecting UC systems, according to one embodiment.

FIG. 3 illustrates a block diagram of an exemplary highly scalable system for interconnecting UC systems, according to one embodiment. While FIG. 3 only illustrates interconnecting four UC systems 311, 321, 331, and 341, the present system can interconnect and support any number of UC systems. The exemplary system of FIG. 3 employs a hub 350 that includes four connectors 351-354. Although FIG. 3 illustrates that each connector communicates with one of the four UC systems 311, 321, 331, and 341, each connector can support any number of UC systems as long as the connector and the UC systems utilize or speak the same protocol (e.g., Session Initiation Protocol (SIP), Extensible Messaging and Presence Protocol (XMPP), or any other) and are within reach of one another in terms of network connectivity. Generally, one connector per UC protocol is needed per realm. A realm is the network region that is reachable from a network interface (to which the connector is bound).

The hub 350 acts as a central station for translating incoming data from any supported UC system into a common language (CL) 355. Depending on the UC application that is implemented on the receiving UC system, the CL 355 is then translated into the language that is supported by the receiving UC system. For instance, a message that is transmitted by UC system 331 and intended for UC system 341 is first transmitted to the hub 350 via connector 353. The message is then translated by hub 350 into a CL 355. Because the message is intended for UC system 341, the CL 355 is then translated into the language that is recognized by the UC application denoted by "UCz" and transmitted to UC system 341 via connector 354.

Similarly, a message that is transmitted by UC system 321 and intended for UC system 341 is first transmitted to the hub 350 via connector 352 and then translated into a CL 355. Again, the CL 355 is then translated into the language that is recognized by the UC application denoted by "UCz" and transmitted to UC system 341 via connector 354. In the case in which two UC systems are running the same UC application, the hub may route a message sent from one UC system to the other without performing translations. As FIG. 3 further illustrates, the hub 350 may, for instance, route a message sent by UC system 311 to UC system 321 without performing translations, as indicated by the perforated line.

The hub may also perform direct translation (e.g., from "UCy" type to "UCz" type) without first translating the message into a CL. Direct translation may be used to achieve higher efficiency and to maintain high fidelity communications.

Under the exemplary embodiment of FIG. 3, each UC system thinks that it is communicating with a UC system that is running the same UC application as itself. Rather than having to maintain separate federations among each particular domain, as illustrated in FIGS. 1 and 2, a network administrator can create a clearing house community that connects multiple domains through a single hub. One advantage of the exemplary system of FIG. 3 is its scalability. For instance, consider adding to the infrastructure of FIG. 3 an additional UC system that is implemented on a new UC application and is associated with a new domain. The addition may simply be implemented by adding the functionality (a one-time job) for translating between the language used by the new UC application and the common language. Depending on the network configurations, an allow list may also need to be updated (also a one-time job) to include any existing or added domain that does not publish an SRV record (discussed more later). Once added, the new UC system would be able to communicate with any of the UC systems already connected to the hub and vice versa. In contrast, adding a new UC system to the infrastructure of FIG. 2 would require building four additional custom links (one for each of the pre-existing UC systems).

In addition to solving the scalability issues described above, the hub or clearing house system illustrated in FIG. 3 also provides for the ability to implement additional features. For instance, the present hub may provide for preservation of high fidelity communication. This disclosure contemplates employing a common language (CL) format that provides for full translation from one UC language format to another without unnecessary or unavoidable loss of information. This may be accomplished by translating the UC formatted message into a CL formatted message such that no data is discarded until the CL formatted message is translated into the UC format that is recognized by the receiving UC system. Unlike using a lowest common denominator approach to defining the CL in which all communications are lowered to the UC language format with the least common functionality, employing a CL format that provides for full translation preserves high fidelity communication between UC systems.

Consistent with one embodiment, the CL is a superset language that supports features (e.g., fields) of all supported UC language formats. For instance, the CL may contain some or all the fields of a supported UC language format. Also, the CL may be an evolving language wherein new syntax (headers) can be added to accommodate any new features that become available in supported UC systems. The new syntax may then be used by all the translators to translate a CL formatted message into a message of respective UC format that supports these new features. In one embodiment, an appropriate CL format is generic SIP.

The hub system also allows administrators to set and enforce policies by virtue of it being a hub for all inter-domain communication. When a UC system in one domain communicates directly (without going through a hub) with a UC system in another domain, administrators of each domain can only control incoming and outgoing messages locally. However, if the UC systems communicate with each other through a hub, the hub allows administrators of each UC system to access the part of the hub that applies to them so that they can administer policies that are not possible to administer locally. For instance, an administrator may administer one or more policies through the hub to allow a user in one domain to make his status appear as available to only certain members of another domain. Such granular control in setting policies is generally not available to administrators of domains interconnected using just federation and custom links.

Hub

Figure 4:
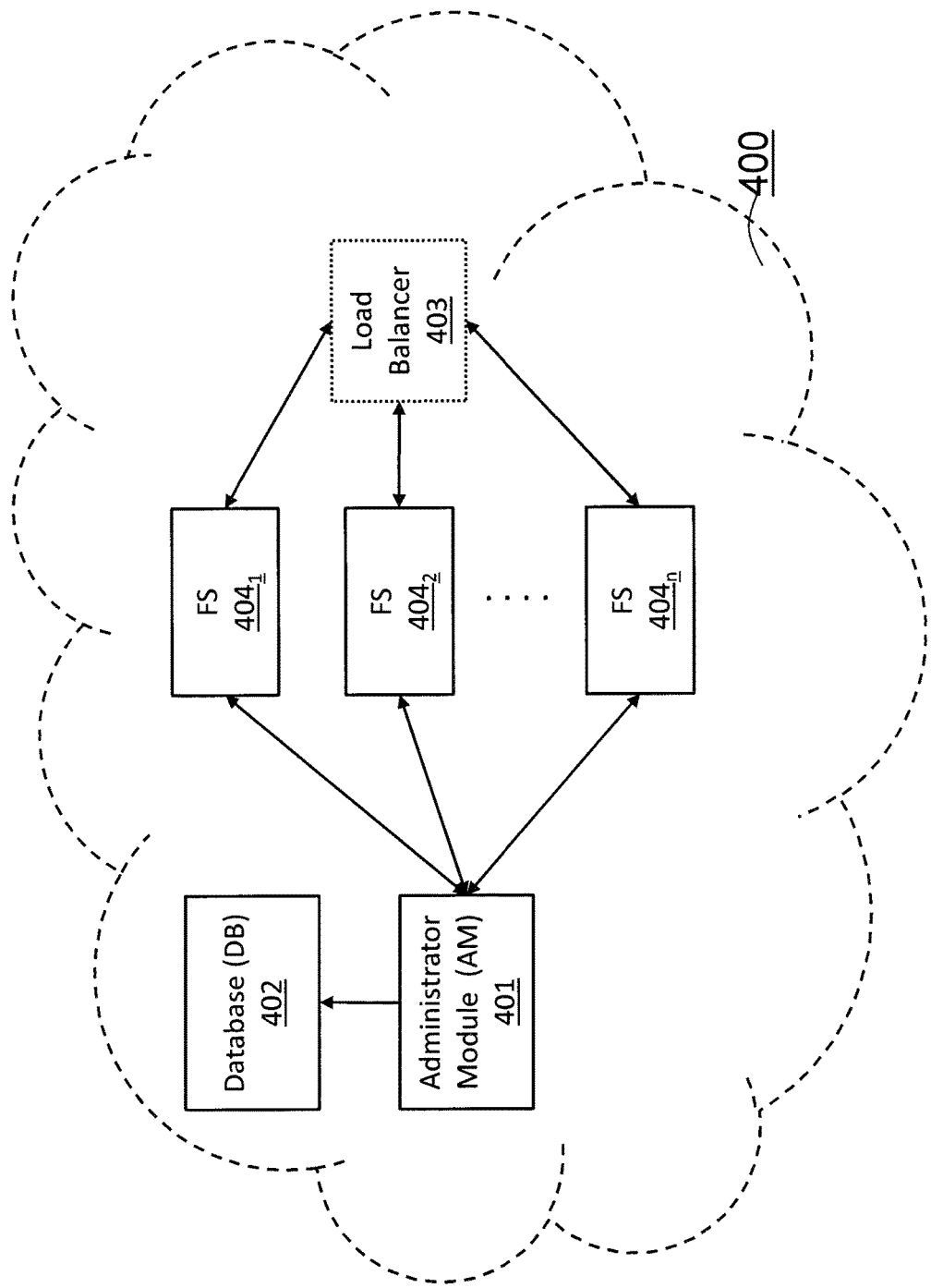
FIG. 4 illustrates a block diagram of an exemplary hub that is implemented as cloud services, according to one embodiment.

FIG. 4 illustrates a block diagram of an exemplary hub that is implemented as cloud services, according to one embodiment. That is, a hub does not necessarily run on a particular server installation or from any particular location. A hub may be broken into four main components: an administration module (AM), a database (DB), a federation server (FS), and a load balancer (LB). While a hub may be implemented using a single computer, FIG. 4 illustrates an exemplary embodiment in which the hub is implemented using several computers, each computer carrying out a specific function, and networked together to create a single installation.

Hub 400 includes an administration module implemented on computer 401. An administration module (AM) is a software program that allows hub system administrators to configure the hub to provide UC systems with access to the hub. There is typically one AM for each installation. The AM configures the hub by creating and updating a data store in a database (DB) implemented on computer 402. The data store contains the information that is used by the federation servers (FS's) to perform their functions. Each of the FS's may be implemented on separate computers $404_{1-n}$. FIG. 4 further illustrates an optional load balancer 403 that manages and directs communications traffic from UC systems to the FS's to make efficient use of the available system resources.

Some of the configurable parameters and desired settings of the AM are as follows:

1. Administrator Settings
   a. In the administration settings the hub administrator can configure the hub to allow for public federation (e.g., allowing the hub to connect to public instant messenger systems such as Google Chat, AIM, and Yahoo Messenger).
   b. A default setting allows federation even if no policy applies to a message. This can be reversed by the administrator so that federation is allowed only if a policy applies to a message.
2. Realms
   a. A physical network card in the FS machine may be configured to support one or more connectors, one connector per protocol. A connector is created by configuring a physical network card to use a supported protocol, such as SIP or XMPP or both, and is described in further detail below.
3. Private Keys and Certificates
   a. Private and public keys may be configured within the hub so that the FS can communicate with UC systems securely. The AM allows private keys to be created for the hub by creating a self-signed key and then creating a certificate signing request which is sent to a certification authority (CA) such as Verisign or Entrust. The reply to the request is imported back into the hub, at which point, the hub can send its public certificate to all the connected UC systems.
   b. The AM acquires public certificates for all domains it would communicate with. The AM fetches the certificate for a domain present in the data store provided the hub is able to communicate over TLS with this domain.
4. Federation Servers
   a. The AM allows administrators to create, edit, and delete servers after the server has been physically built with the proper hardware. The proper settings for creating a federation server depend on the number of network cards installed on the server. Each network card may be configured to use each type of connector that is used within the realm that it is associated or may serve as a spare or may be used for other communication purposes (e.g., to DB or to the AM). A connector typically supports a single UC protocol (e.g., SIP or XMPP). However, a connector may have multiple transports configured for its UC protocol (e.g., a SIP connector configured to support SIP over TLS and SIP over TCP and an XMPP connector configured to support XMPP over TCP and XMPP over TLS).
   b. The administrator must also configure private keys and corresponding public keys and certificates so the AM can communicate internally with each FS in the installation securely. The AM and each FS communicate over TLS which requires that the AM and each FS have a private key and that the corresponding certificates (public keys) are available to the other side. This enables the AM and each FS to communicate internally over TLS.
5. Domains
   The following information for each domain that will be communicating through the hub are added to the database:
   i. Domain name (e.g., UC4.acme.com)
   ii. Whether the Domain is public or not
   iii. One of the following methods of acquiring the IP address is required:
      1. Use DNS SRV record to fetch the IP address
      2. Use the FQDN to fetch the IP address
      3. Input the IP Address directly
6. Policies
   a. Each policy has a name and action flags (e.g., allow, deny). There may be six types of messages that flow thru the hub: buddy invite, presence, chat, audio call, video call, and file transfer. The criteria for the policy can be specified in a structured fashion using lists and attributes of addresses involved in the address.
   i. Policy actions
      1. Buddy list invites can be allowed or denied.
         (A buddy list invite (or SUBSCRIBE as it is called in SIP/XMPP) is sent from user A to user B via the hub when user A adds user B to his contact (buddy) list)
      2. Instant Messages can be allowed or denied
      3. Presence can be allowed or denied
      4. Audio calls
      5. Video calls
      6. File transfer
   ii. Policy lists: System administrators create lists in the database which can be referenced in the policy rules. Each list may be used by the policy rules described above. The following are the types of lists that can be created by the administrators:
      1. List of Addresses
      2. List of Domains
      3. List of Groups (e.g., Using Microsoft Active Directory)
   iii. Criteria: policy criteria are specified in each policy. These criteria determine when a policy is applied to a message (specifically the source and destination addresses) being processed. Up to five criteria can be specified and each criterion applies to source, destination, both or either address in the message. The operation specified on the address(es) may be one of: is-internal, is-external, is-public, is-present-in-list or the negation of one of them.
7. Directory (For Microsoft Active Directory Functionality)
   a. Administrator can populate users and groups in the data store by having the hub connect to an active directory and download the users and groups, which eliminates duplication of data already present. Once these users and groups are downloaded, the administrator can reference them in the policies as described above.
   Once the AM and the connected UC systems have been properly configured, individual users on a configured UC system can connect to other users on any other properly configured (remote or local) UC system.

As mentioned earlier, the AM configures the hub by creating and updating a data store in a database (DB) implemented on computer 402. In addition to storing configuration data received from the AM, the DB also stores data regarding local administrators (administrators of UC systems connected to the hub), local users (users in the domains of associated UC systems), and FS's. In general, because only the AM can directly manipulate data in the DB, local administrators who wish to update the DB data would have to log into the AM to do so. Local user information that may be stored in the DB include usage and audit logging information. The DB may be implemented as a relational data base.

FIG. 4 illustrates that each of the FS's may be implemented on separate computers $404_{1-n}$. The computers $404_{1-n}$, are substantially identical to one another regarding their physical hardware configurations. Each FS computer typically has three network cards installed. However, more than or less than three network cards per computer are also contemplated. Furthermore, the software applications installed on each of the computers $404_{1-n}$, are configured in almost an identical fashion to one another except that each computer is given a unique identification value.

Figure 5:
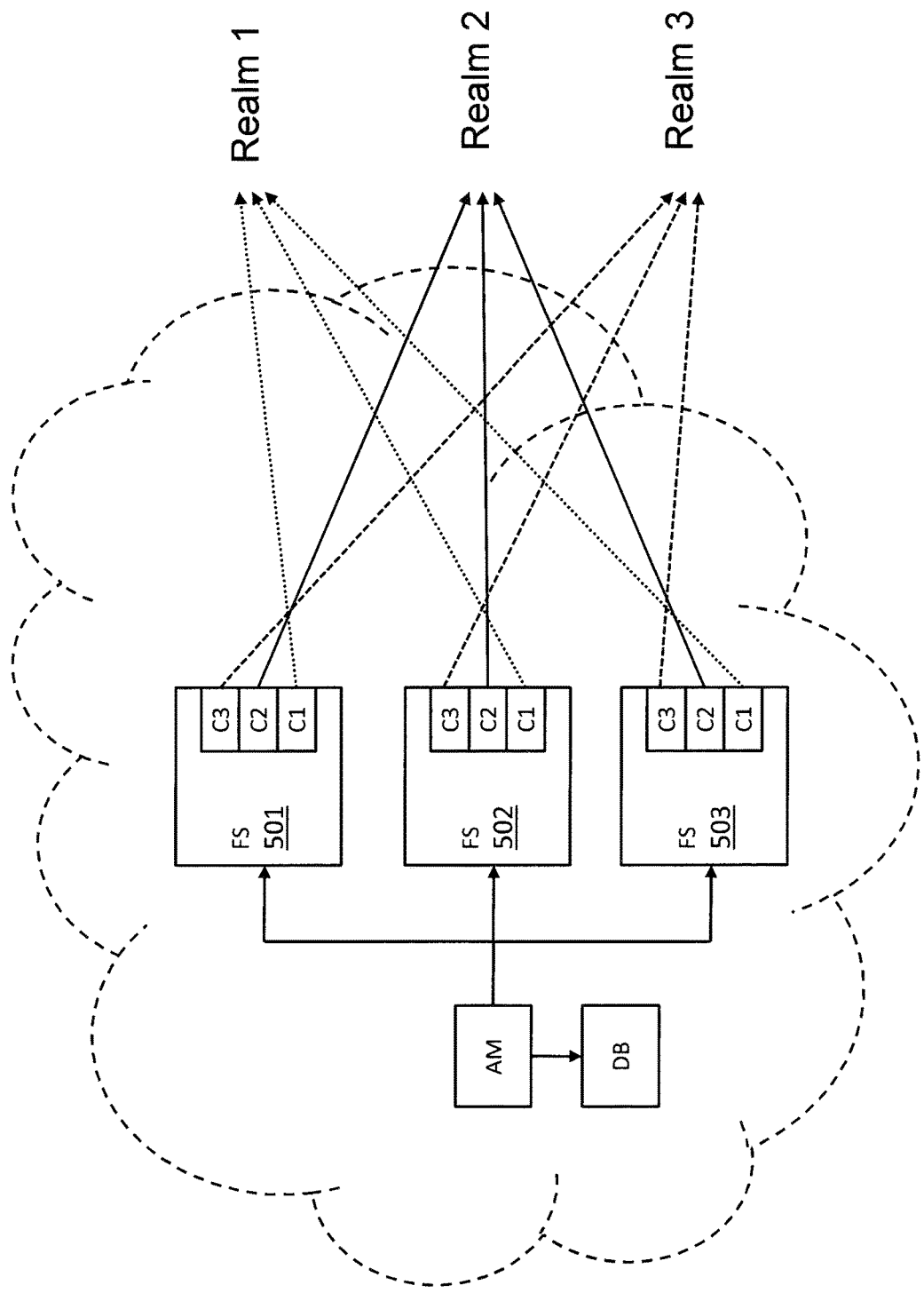
FIG. 5 illustrates a block diagram of an exemplary hub that is connected to each of three realms, according to one embodiment.

FIG. 5 illustrates a block diagram of an exemplary hub that is connected to each of three realms, according to one embodiment. Each of the computers 501-503 has three network cards (C1, C2, and C3) installed. In order for each FS to provide access to each of the three realms, each network card of a FS is connected to a different realm. A realm is a network region or network segment that is reachable through a particular network card. For instance, in an enterprise network there is often an internal network (e.g., intranet) and an external network (e.g., Internet). A computer sitting in the demilitarized zone (DMZ) of the enterprise may need a network card to access the intranet (e.g., realm 1) and another network card to access the Internet (e.g., realm 2). Any number of realms may exist. Another example of a realm is a private network that is accessible through a private link (e.g., remote branch office).

A FS has two main components: (1) instances of connectors, and (2) the DP Application Logic (herein "engine"). A connector is an object that includes both a hardware aspect and a software aspect. The hardware aspect includes a physical network card connection that provides a physical pathway for data to flow into and out of a FS machine. The software aspect of a connector, in its basic form, is comprised of (1) a listening loop that listens on the physical connection and waits for incoming data, and (2) a function that can be called by the FS when data is ready to be sent out from a network card of the FS.

Figure 6:
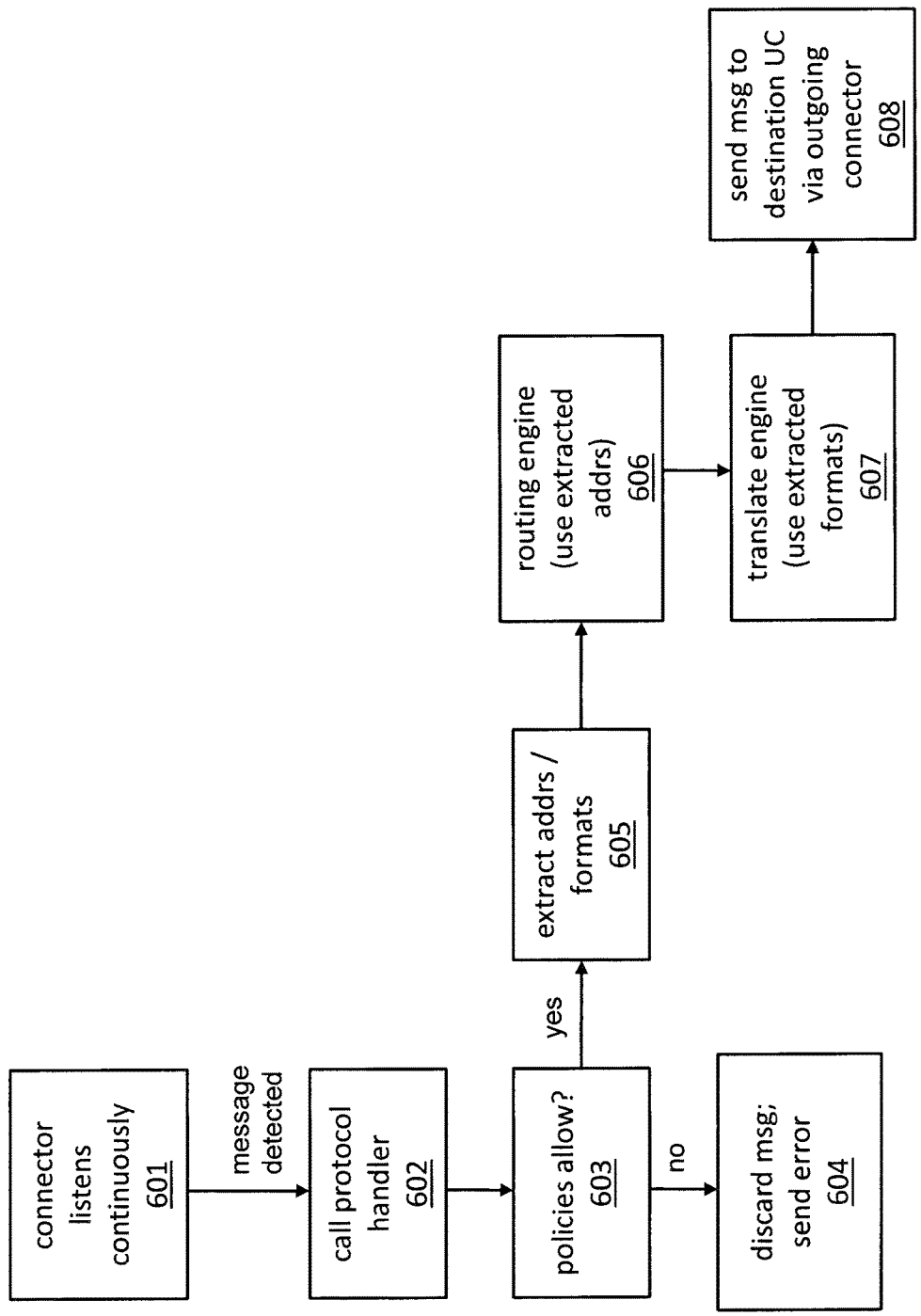
FIG. 6 illustrates a flow chart of an exemplary process for processing messages received from a UC system, according to one embodiment.

FIG. 6 illustrates a flow chart of an exemplary process for processing messages received from a UC system, according to one embodiment. The operations begin with the connectors of the FS continuously listening (at 601) for an on-the-wire message, such as a SIP or XMPP message. If a message is detected, a protocol handler is called (at 602) to translate the detected on-the-wire message into an internal memory representation of the message (IMRM). After translating into an IMRM, the hub message manager (HMM) uses a policy enforcement engine to check the IMRM against policies set up by the administrators (at 603) and decides whether the IMRM should be allowed. If the IMRM is found not to be allowed, an error message is sent back to the incoming connector which received the message and the IMRM is discarded (at 604). The error message, which may include information as to why the message was not allowed, is relayed back to the originating UC through the incoming connector. On the other hand, if the IMRM is found to be allowed, the HMM extracts the destination and source addresses as well as the destination and source UC formats from the IMRM (at 605). Using the extracted addresses, the HMM uses a routing engine to determine the destination route for the IMRM (at 606). The routing engine also adds necessary information to the IMRM to ensure the message is ready for the destination domain. For instance, the added information may include routing headers that allow SIP and XMPP outgoing connectors to route the message to the appropriate UC systems. Next, the HMM processes the IMRM using a translation engine (at 607). The translation engine first checks the data store to see if direct translation is available. If so, direct translation is used. If not, the translation engine translates the IMRM into the CL format and then translates the CL formatted message into the destination UC format. The translation engine uses the formats that were extracted at 605. After translation into the destination UC format, the message is translated into an on-the-wire format and then sent out to the destination UC system via an outgoing connector (at 608). The outgoing connector is determined by the routing engine at 606 and it uses the realm and the UC protocol of the destination UC system. Thus, connector is used for both sending and receiving messages.

Figure 7:
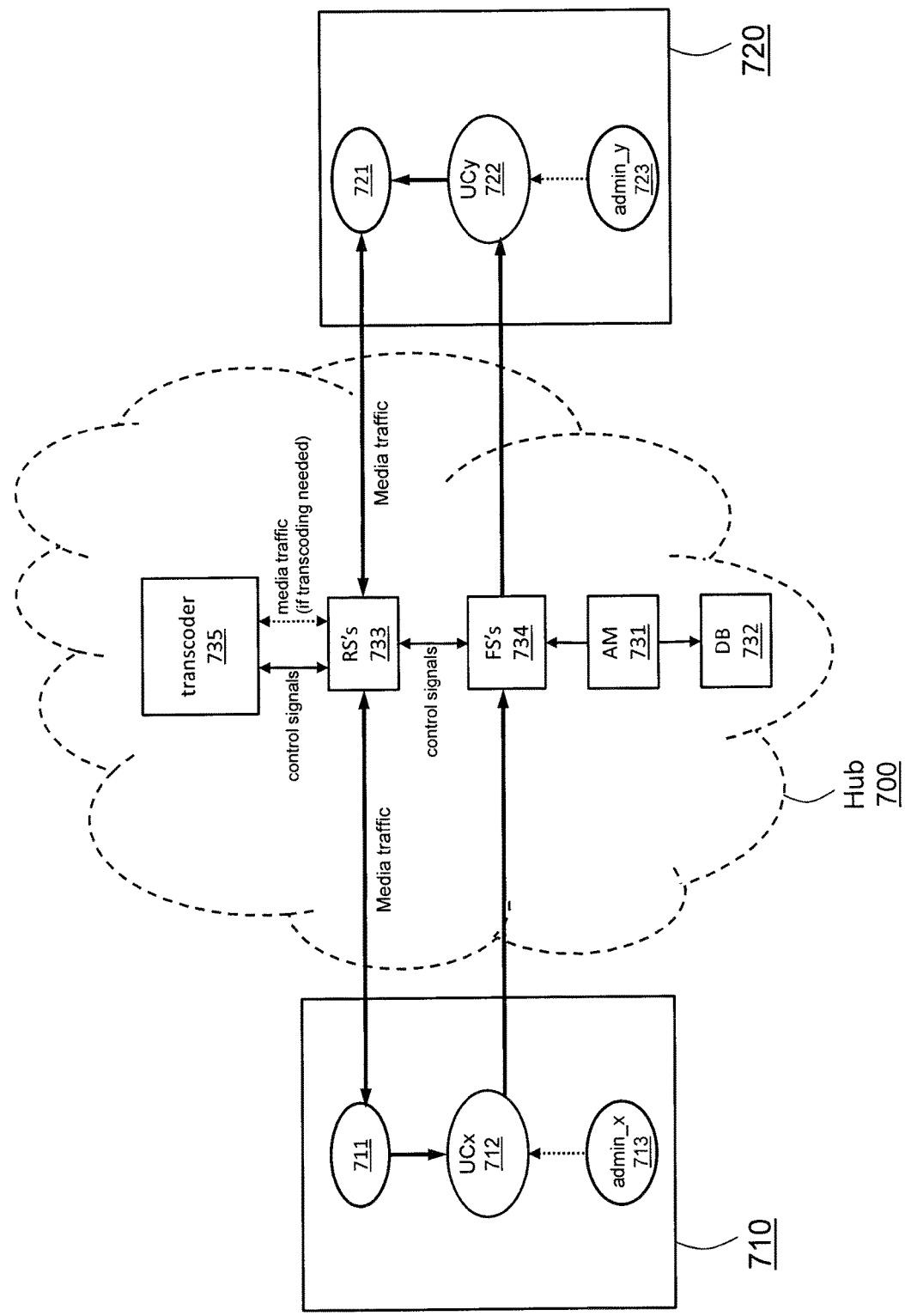
FIG. 7 illustrates a block diagram of an exemplary hub system for processing real-time media traffic such as audio and video traffic, according to one embodiment.

FIG. 7 illustrates a block diagram of an exemplary hub system for processing real-time media traffic such as audio and video traffic, according to one embodiment. As FIG. 7 illustrates, clients 711 and 721 communicate with one another through their respective UC systems 712 and 722 and hub 700. Hub 700 includes a federation server (FS) 734, a relay server (RS) 733, and a transcoder 735. While FS 734 processes messages received from UC systems (e.g., UCx 712 and UCy 722), such as illustrated in FIG. 6, RS 733 processes media traffic such as audio and video traffic between clients 711 and 721. For instance, if FS 734 determines that a media call initiate or INVITE message has been received, FS 734 sends control signals to RS 733 to engage and control certain operations of RS 733. These control signals include start-call, end-call, and caller/callee information such as media endpoint candidates and media codecs that are available. If RS 734 determines that clients 711 and 721 have at least one common media codec that is available to each client, RS 734 relays the media traffic between clients 711 and 721. The media traffic originating from client 711 would flow as follows:

client 711→RS 733→client 721

Similarly, media traffic originating from client 721 would flow as follows:

client 721→RS 733→client 711

If there is no common codec that is available to clients 711 and 721, RS 733 engages transcoder 735 to transcode the media traffic from one codec format (e.g., format used by client 711) to another codec format (e.g., format used by client 721) and vice versa. For instance, if transcoding is needed, media traffic originating from client 711 would flow as follows:

client 711→RS 733→Transcoder 735→RS 733→client 721

Similarly, media traffic originating from client 721 would flow as follows:

client 721→RS 733→Transcoder 735→RS 733→client 711

RS 733 engages transcoder 735 via control signals that, for instance, tell the transcoder 735 to set up and tear down the media endpoints (e.g., RTP and RTCP ports) that were set up at the transcoder for sending and receiving media to/from RS 733. The RS 733 then broadcasts an OFFER message to transcoder 735. If the transcoder 735 node has a capacity to answer the OFFER message from RS 733, the transcoder 735 node responds with an ANSWER message and the call is directed to that node.

Although load balancers are not shown in FIG. 7, this disclosure contemplates that a load balancer may be used as an intermediary component of hub 700 for managing and directing communications traffic between UC systems 712 and 722 and FS 734. This disclosure also contemplates employing a load balancer as an intermediary component of hub 700 for managing and directing media traffic between clients 712 and 722 and RS 733. This disclosure also contemplates employing a load balancer as an intermediary component of hub 700 for managing and directing media traffic to multiple relay server nodes acting as a single logical relay server RS 733. The use of load balancers allows hub 700 to make efficient use of the available system resources and to be highly scalable.

Figure 8:
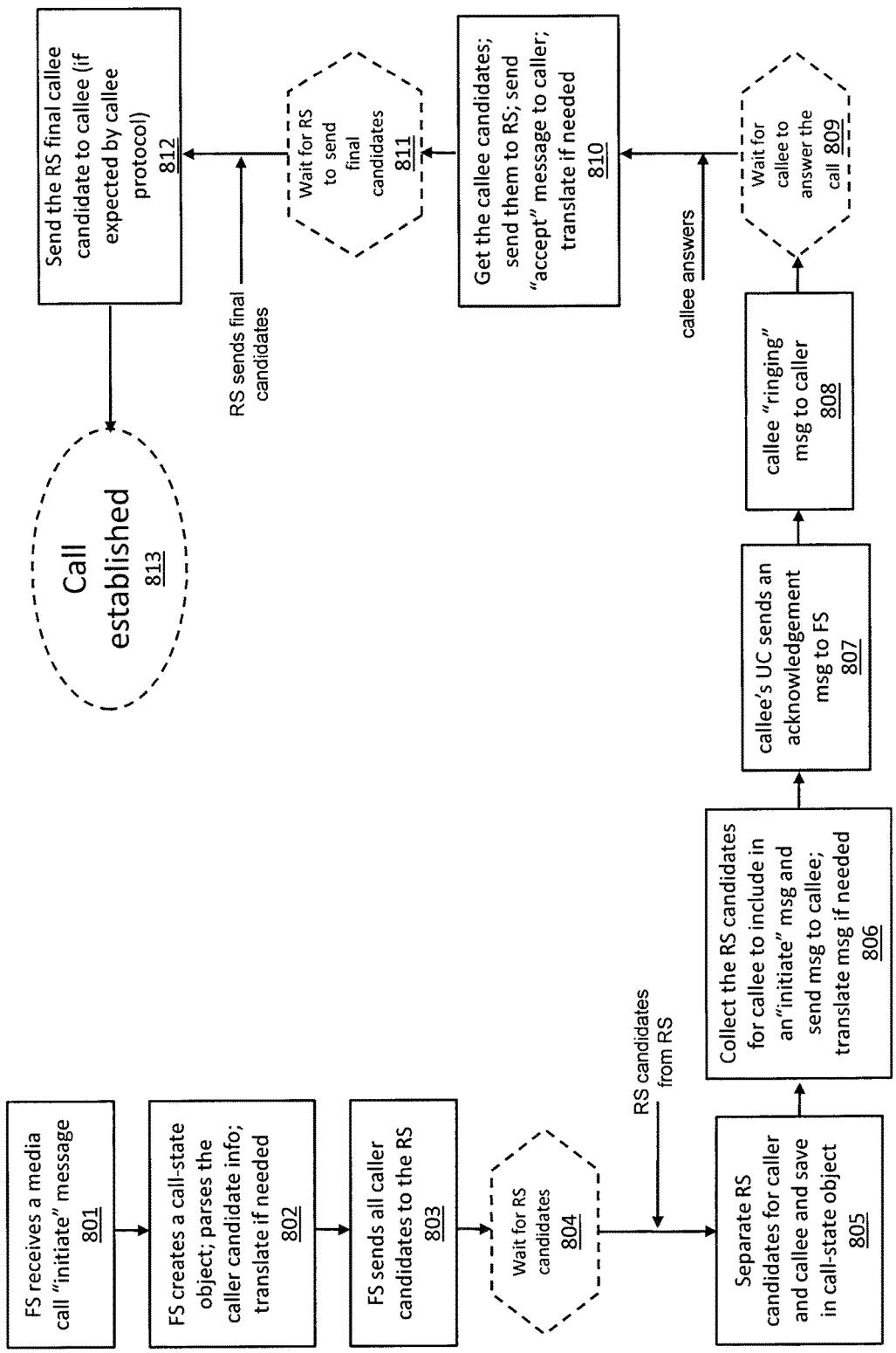
FIG. 8 illustrates a flow chart of an exemplary process for processing a media call by a federation server, according to one embodiment.

FIG. 8 illustrates a flow chart of an exemplary process for processing a media call by a federation server, according to one embodiment. The process begins (at 801) when the federation server (FS) receives a media call initiate or INVITE message from a calling client ("caller"). The initiate message may or may not include the caller candidates. Caller candidates are IP addresses and ports at which the caller can receive media traffic. If the caller candidates are not included, they may be sent in a separate message (not shown in FIG. 8). Next, the FS creates a call-state object and also parses the caller candidate information (at 802). If the caller and the intended client for receiving the call ("callee") employ different UC systems, the message may need to be translated to a common language (CL) format. A call-state object is maintained for each call started and is deleted when the call is hung up.

Next, the FS sends all caller candidates to the RS via an add-candidate message (at 803). (See FIG. 9). The FS waits for the RS to return RS candidates (at 804). RS candidates are IP addresses and ports at which the RS can receive data from clients. Because the RS receives data from both a caller and a callee, there are separate RS candidates for the caller and callee. After the FS receives the RS candidates from RS, the FS separates the RS candidates for the caller and the callee and saves them in the call-state object (at 805). Next, the FS collects the RS candidates for callee to include in an initiate message that is sent to the callee (at 806) through the callee's UC system. If the caller and the callee employ different UC systems, the message may need to be translated from a CL format to the language format that is recognized by the callee's UC system prior to being sent. Typically, a response or acknowledgement message is sent back by the callee's UC system after receiving the message (at 807). When the callee receives the initiating message, the callee sends to the caller (e.g., callee→callee UC→FS→caller UC→caller) a ringing message (at 808). Again, if the caller and the callee employ different UC systems, the message may need to be translated to an appropriate format as described earlier in this disclosure.

The FS waits for the callee to answer the call (at 809). After the callee answers the call, the FS parses the answer to obtain the callee candidates, which are then sent to the RS. Callee candidates are IP addresses and ports at which the callee can receive media traffic. The FS also sends an accept message (translated if appropriate) to the caller (at 810). The accept message signals to the caller that the callee has accepted the call. The accept message also contains the RS candidates for the caller. After receiving these RS candidates, the caller may use them to establish connectivity thru ICE negotiation, such as described in FIG. 10.

Next, the FS waits for the RS to return final candidates (at 811). Final candidates are IP addresses and ports are the best remote candidates for transferring data between the RS and the caller/callee. The RS determines the final candidates by performing ICE connectivity checks (e.g., exchanging STUN messages) with both the caller and the callee. For instance, the RS would use different pairs of callee candidates and RS callee candidates to exchange STUN messages to determine the final callee and RS callee candidates. Similarly, the RS would use different pairs of caller candidates and RS caller candidates to exchange STUN messages to determine the final caller and RS caller candidates. After the RS returns the final candidates, the FS may send the final RS callee candidate to the callee if the callee protocol expects it (at 812). Finally, the call is established (at 813).

Figure 9:
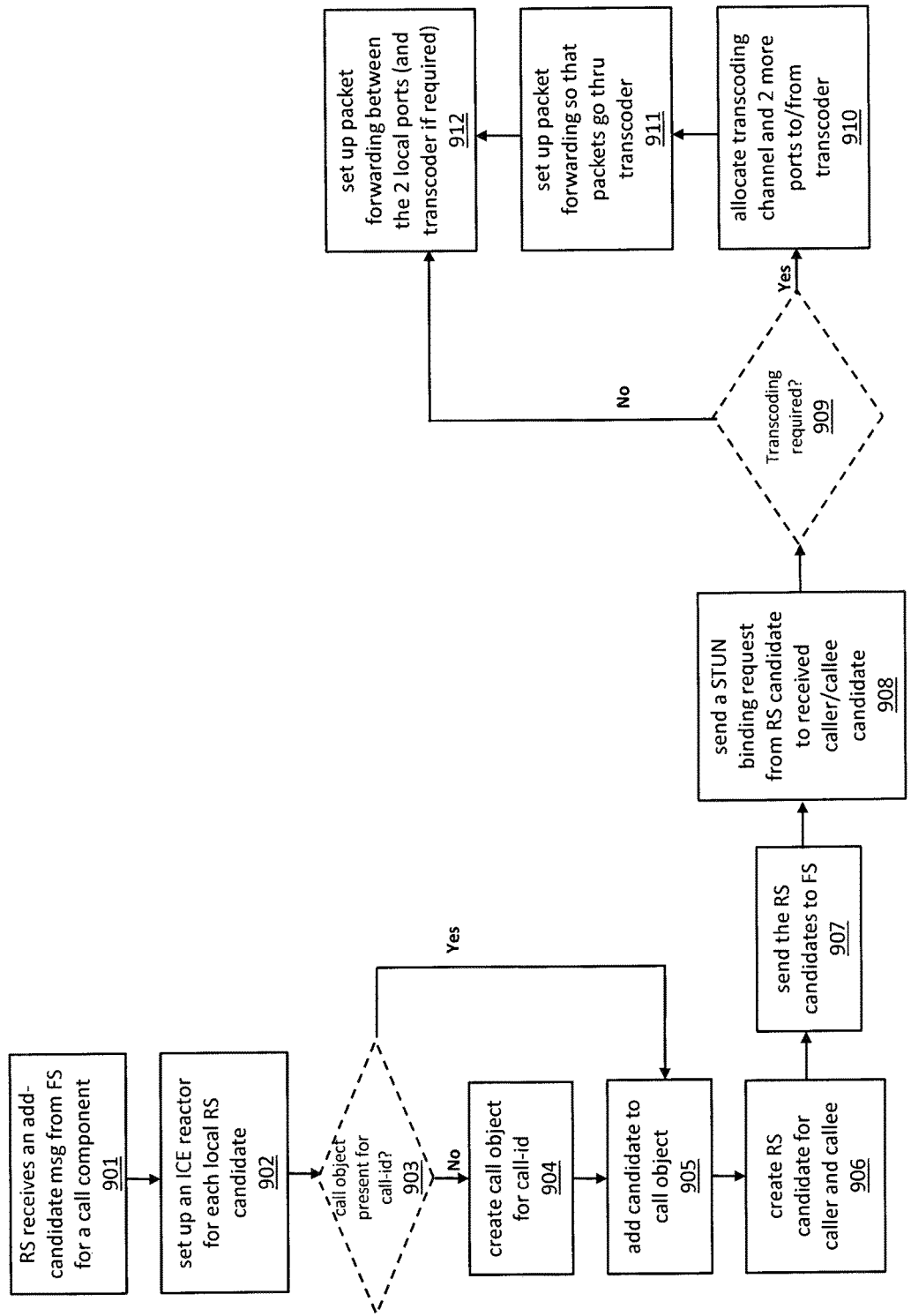
FIG. 9 illustrates a flow chart of an exemplary process employed by a relay server for adding candidates, according to one embodiment.

FIG. 9 illustrates a flow chart of an exemplary process employed by a relay server for adding candidates, according to one embodiment. The process begins when relay server (RS) receives an add-candidate message from the federation server (FS) for a call component (at 901). A call has multiple components such as audio-rtp, audio-rtcp, video-rtp and video-rtcp. Each component carries a certain aspect of media traffic. For instance, audio-rtp carries audio packets and video-rtp carries video packets. Rtcp is for control of rtp. The process applies to all components of a call. An add-candidate message is a request for the RS to return (to the FS) RS candidates for a caller and a callee and may include the following: call-id, caller address (e.g., IP address and port per candidate), callee address, and caller UC system (e.g., OCS or GTalk).

Next, the RS sets up an ICE reactor for each local RS candidate (at 902). An ICE reactor performs at least two functions. One function is to establish ICE connectivity through STUN negotiaion. After connectivity is established, a second function is to forward data packets between two peers. Next, the RS determines whether a call object is present for the call-id associated with the add-candidate message (at 903). If no call object is present, the RS creates a call object for the call-id (at 904). Next, the RS adds the candidates that are provided in the message to the call object (at 905). The RS then creates RS candidates for each of the caller and the callee (at 906) and sends them to the FS (at 907).

Next, the RS sends STUN binding requests through RS caller candidates and RS callee candidates to caller candidates and callee candidates, respectively (at 908). Next, the RS determines whether transcoding is required (at 909). Transcoding may be required if there exists no common media codec that is used by both caller and callee. If transcoding is not required, the RS sets up packet forwarding between the two local ports that have been allocated for the caller and the callee (at 912). For instance, if port A is used by the caller and port B is used by the callee, the RS forwards packets from A to B and vice versa. If transcoding is required, the RS allocates a transcoding channel and two additional ports for (e.g., port C for sending traffic to transcoder and port D for receiving traffic from transcoder) for communicating with the transcoder (at 910). The RS then sets up packet forwarding so that packets go through the transcoder (at 911). For instance, if transcoding is required, then the packet forwarding through the ports A to D would be as follows:

A→C→transcoder→D→B and vice versa.

Figure 10:
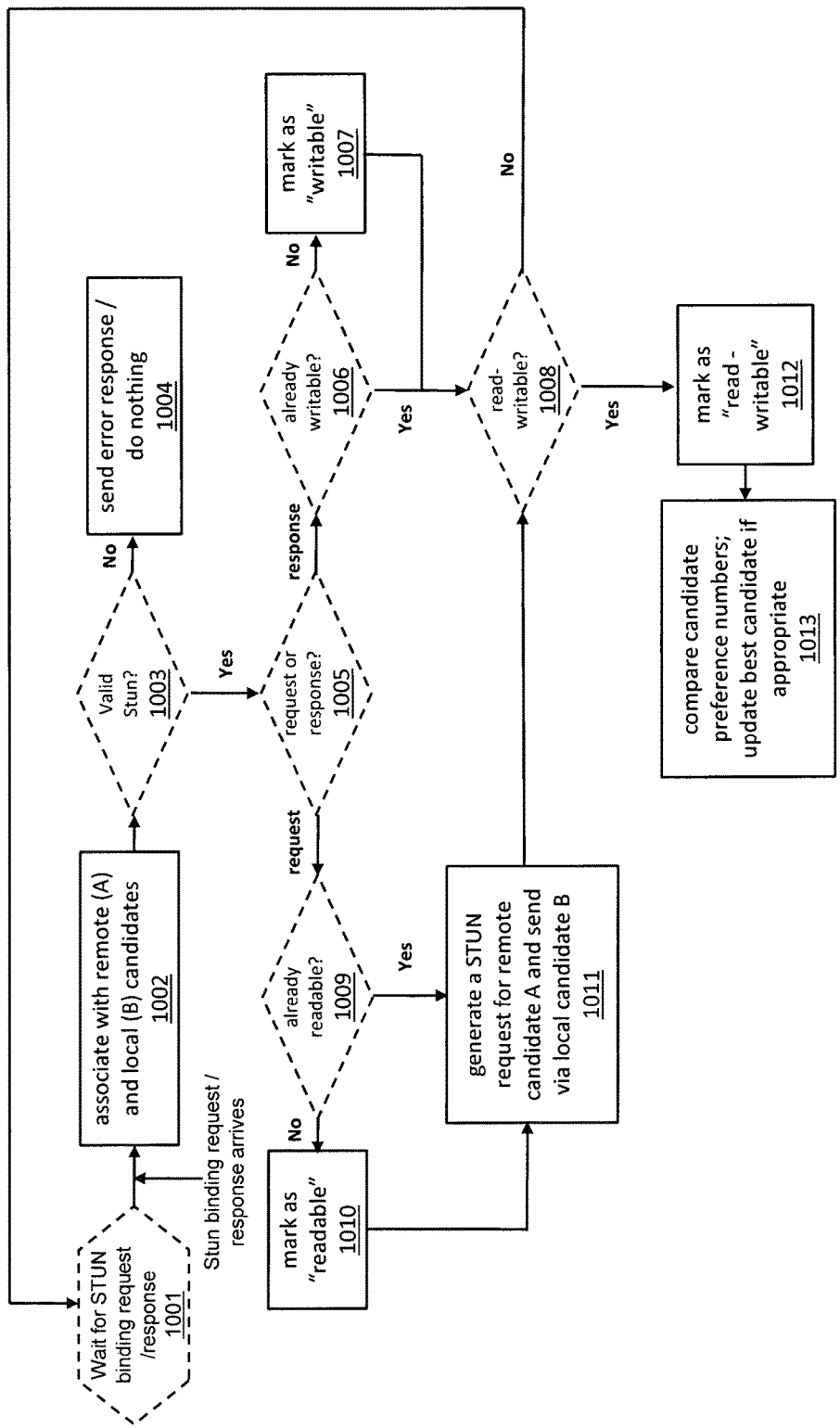
FIG. 10 illustrates a flow chart of an exemplary process employed by an interactive connectivity establishment (ICE) reactor that is part of a relay server for establishing ICE connectivity through session traversal utilities for network address translation (NAT) (STUN) negotiation, according to one embodiment.

FIG. 10 illustrates a flow chart of an exemplary process employed by an ICE reactor for establishing ICE connectivity through STUN negotiation, according to one embodiment. An ICE reactor is set up for each local port that is allocated for a specific call. The ICE reactor ("reactor") waits for a STUN binding request/response ("STUN message") (at 1001). When a STUN message arrives to the port, the ICE reactor (or rather RS) knows which call it is for and associates it with remote (A) and local (B) candidates (at 1002). The reactor then determines whether the STUN message is valid (at 1003). The determination may be made based on industry standards, such as described in RFC5389 published by the Internet Engineering Task Force (IETF). If the STUN message is not valid, the reactor sends an error response back to the originator of the STUN message if the message is a request or does nothing if the message is a response (at 1004).

If the STUN is valid, the reactor then determines whether it is a response or a request (at 1005). If the STUN is a response, the reactor determines whether remote candidate A is already writable (at 1006). If remote candidate A is already writable, the reactor proceeds to 1008. Otherwise, the reactor marks remote candidate A as writable (at 1007) before proceeding to 1008. If the STUN is a request, the reactor determines whether remote candidate A is already readable (at 1009). If remote candidate A is already readable, the reactor proceeds to 1011. Otherwise, the reactor marks remote candidate A as readable (at 1010) before proceeding to 1011. At 1011, the reactor generates a STUN request for remote candidate A that is sent via local candidate B.

At 1008, the reactor determines whether remote candidate A is both readable and writable. If remote candidate A is both readable and writable, the reactor marks remote candidate A as read-writable (at 1012), indicating that the candidate is ready to be used for communication, before proceeding to 1013. Otherwise, the candidate is not ready to be used for communication and the reactor proceeds back to 1001. At 1013, the reactor determines whether the current candidate is preferred over the best remote candidate. For instance, the reactor may compare the current candidate's preference number with that of the best remote candidate (e.g., candidate associated with highest preference number). If the current candidate's preference number is higher than (e.g., preferred over) that of the best remote candidate, the reactor makes the current candidate the best remote candidate.

Figure 11:
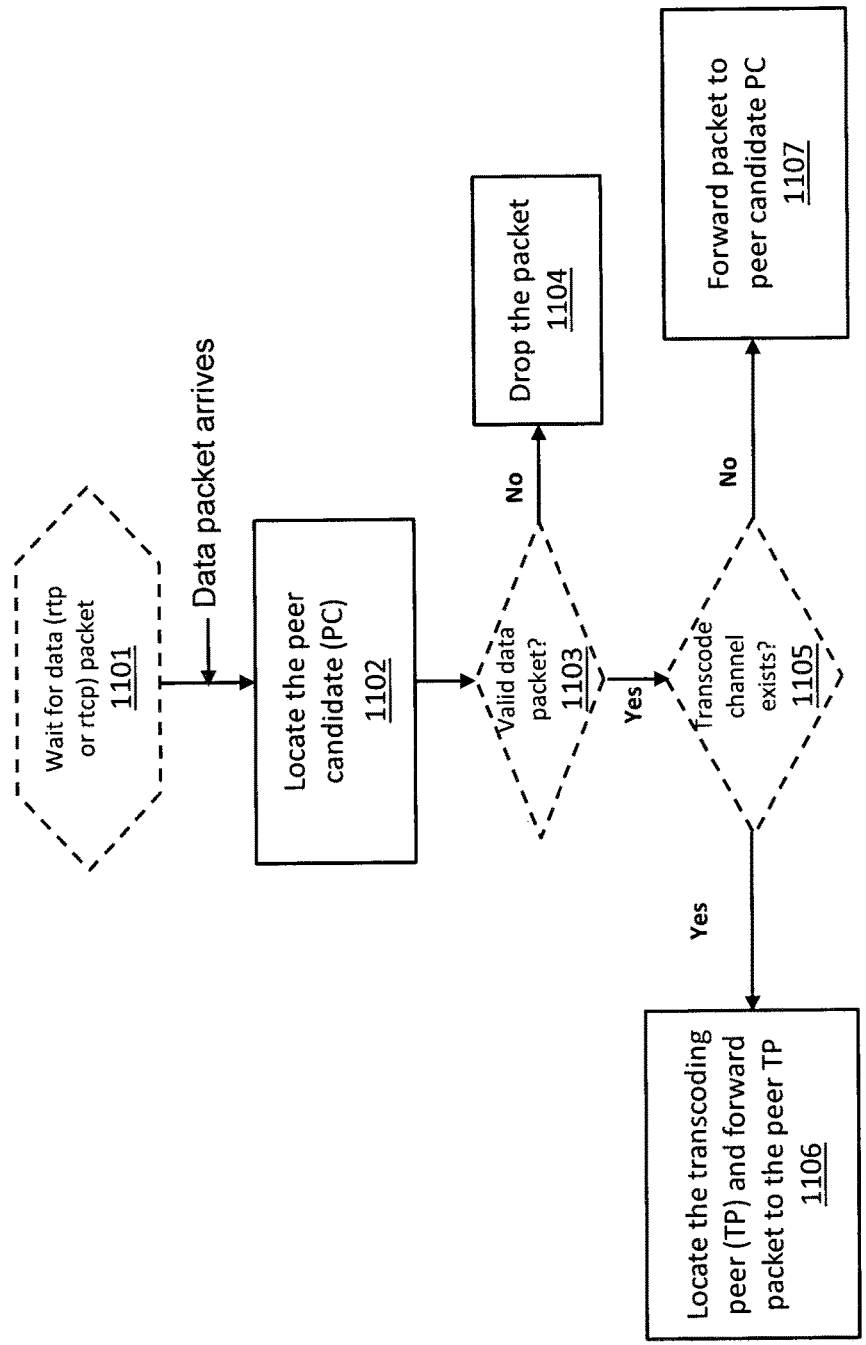
FIG. 11 illustrates a flow chart of an exemplary process employed by an ICE reactor for forwarding data packets once ICE connectivity has been established, according to one embodiment.

FIG. 11 illustrates a flow chart of an exemplary process employed by an ICE reactor for forwarding data packets once ICE connectivity has been established, according to one embodiment. The ICE reactor ("reactor") waits for data (e.g., RTP or RTCP) packets (at 1101). The ICE reactor is set up for each local port that is configured for a specific call. Once a data packet arrives at the port, the ICE reactor (or rather RS) knows which call it is for and based on that information, the ICE reactor finds the peer candidate (PC) (at 1102). Next, the reactor determines whether the data packet is valid (at 1103). The determination may be made based on industry standards regarding whether the packet is a valid RTP/RTCP packet. If the data packet is determined to be invalid, the data packet is dropped (at 1104). If the data packet is determined to be valid, the reactor then determines whether a transcode channel exists (at 1105). If a transcode channel exists, the reactor locates the transcoding peer (TP) and forwards the data packet to the peer TP (at 1106). If a transcode channel does not exist, the reactor forwards the data packet to the PC (at 1107).

Figure 12:
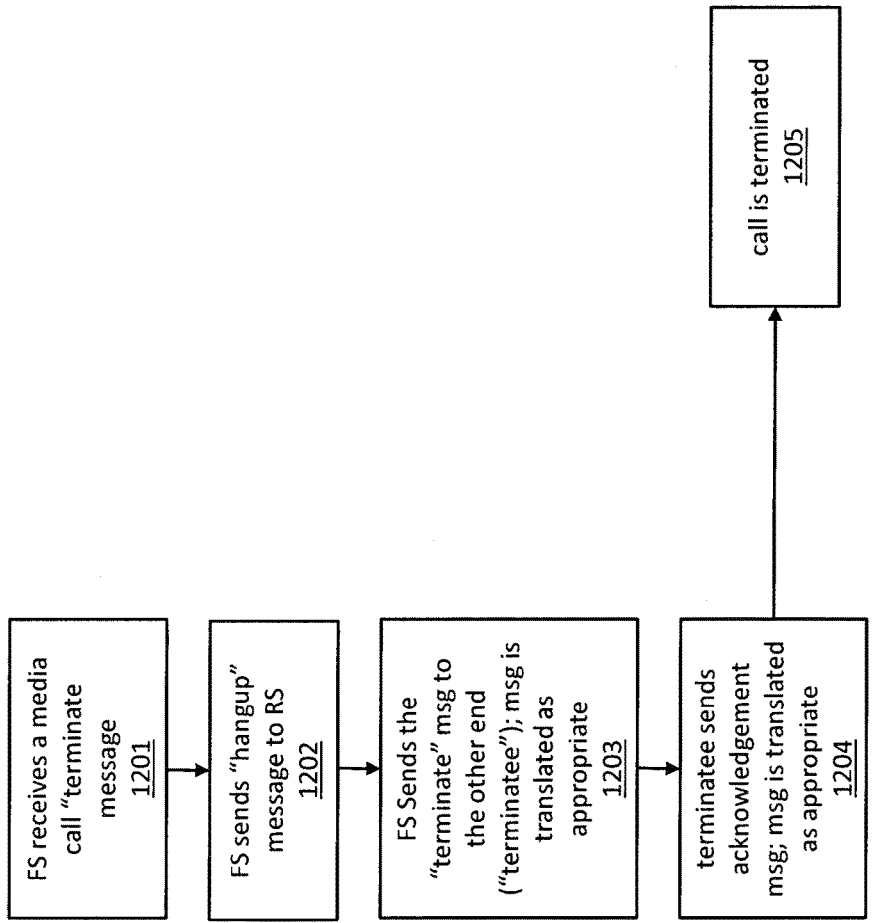
FIG. 12 illustrates a flow chart of an exemplary process employed by a federation server for terminating a media call, according to one embodiment.

FIG. 12 illustrates a flow chart of an exemplary process employed by a federation server for terminating a media call, according to one embodiment. The process begins when the federation server (FS) receives a media call terminate message from a caller or a callee ("terminator") (at 1201). In response, the FS sends a hang-up message to the relay server (RS) (at 1202). Next, the FS sends the terminate message to the "terminate" (e.g., the other party to the call who did not originate the terminate message) (at 1203). If the terminator and the terminatee employ different UC systems, the message may need to be translated appropriately as described earlier in this disclosure (e.g., terminator UC format common language terminate format) prior to being sent. In response to the terminate message, the terminatee sends an acknowledgement message back to the terminator through the FS (at 1204). Again, appropriate translation of the message by the FS may be necessary. After receiving the acknowledgement message, the terminator finishes the call tear down sequence and the call is terminated (at 1205).

Figure 13:
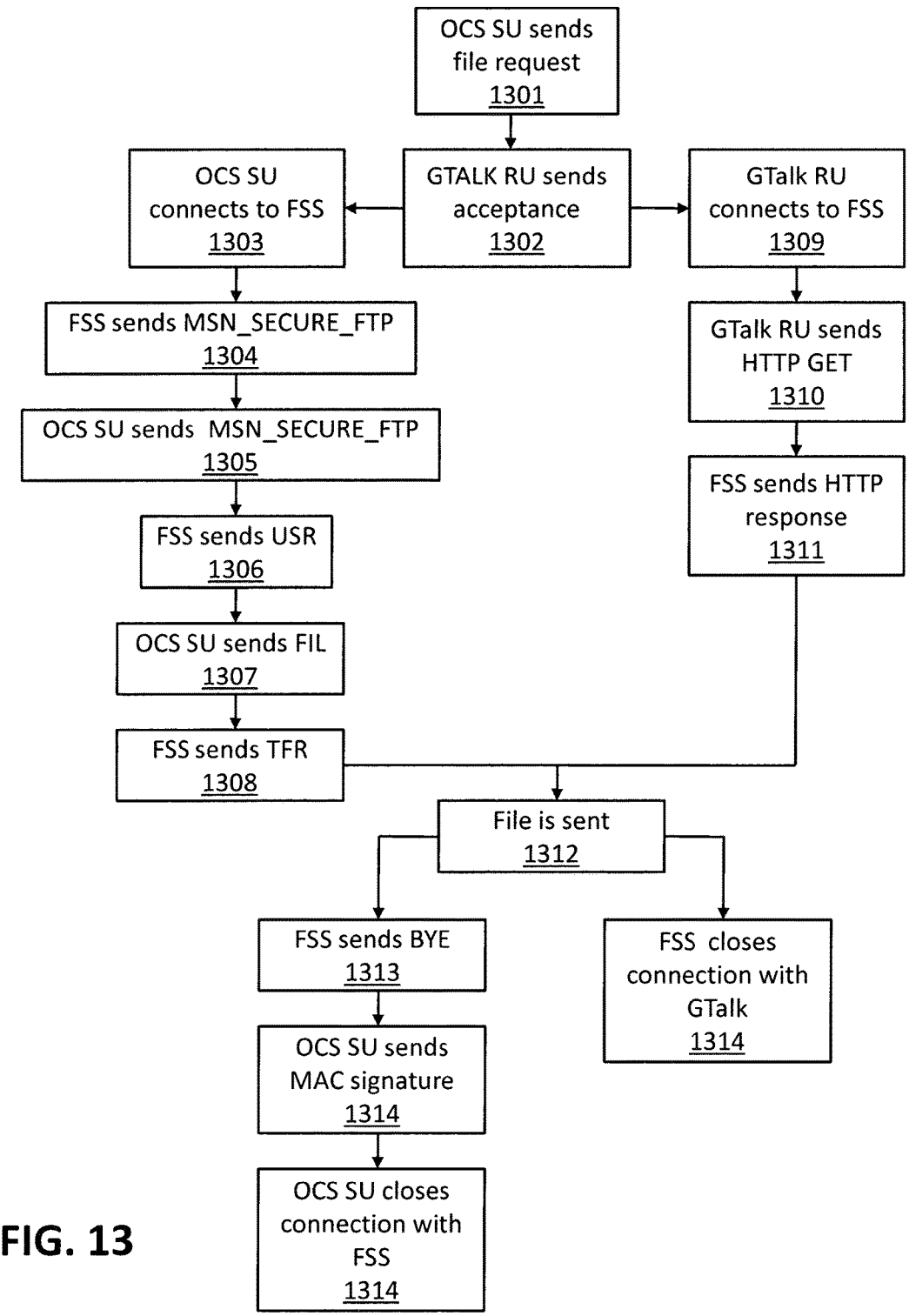
FIG. 13 illustrates a flow chart of an exemplary process for transferring a file from an OCS user to a GTalk user, according to one embodiment.

FIG. 13 illustrates a flow chart of an exemplary process for transferring a file from an OCS user to a GTalk user, according to one embodiment. File transfer is handled by a hub and a file share server (FSS) as follows. When an OCS sending user (OCS SU) wants to send a file, a request is sent to the hub (at 1301) and processed by a FS as illustrated in FIG. 6. The hub relays the request to the receiving GTalk user (GTalk RU). Once the GTalk RU accepts the request, an acceptance message is sent back through the hub to the OCS SU (at 1302). The acceptance message is again processed by a FS as illustrated in FIG. 6. Next, both the OCS SU and the GTalk RU connect to the FSS via TCP (at 1303 and 1309, respectively). TCP is the common protocol over which UC specific protocols such as TFTP and HTTP are implemented.

After OCS SU connects successfully to the FSS, the FSS sends to the OCS SU a signal indicating the protocol that will be used (e.g., VER MSN_SECURE_FTP) (at 1304). The OCS SU replies to the FSS with the same string indicating the protocol (at 1305). After GTalk RU connects successfully to the FSS, the GTalk RU sends to the FSS an HTTP GET to request the file (at 1310). In response, the FSS sends an HTTP Response (at 1311).

The FSS sends the OCS SU a USR signal for authentication (at 1306). If the USR signal is valid, the OCS SU sends back to the FSS a FIL signal that indicates the file size (at 1307). Next, the FSS sends a TFR signal to the OCS SU (at 1308). Next, the OCS SU sends the file to the FSS while the FSS sends the file to the GTalk RU (at 1312). Because the FSS knows the file size, the FSS knows when a file has finished transferring and sends a BYE signal to the OCS SU indicating a complete transfer (at 1313). Next, the OCS SU sends a MAC signature to the FSS to check the transfer (at 1314). Finally, the OCS SU closes the connection with the FSS (at 1315) and the FSS closes the connection with the GTalk RU (at 1316).

Figure 14:
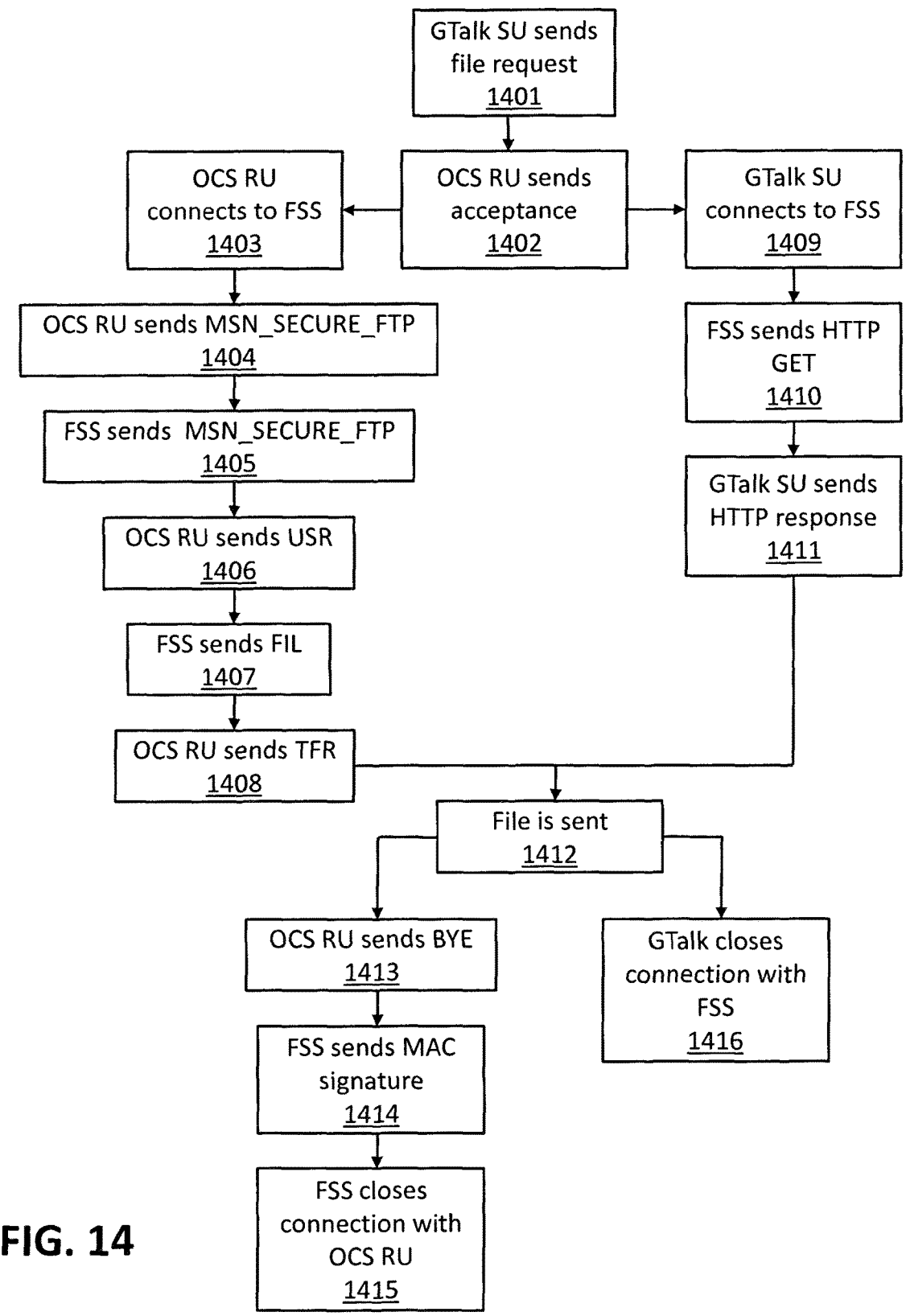
FIG. 14 illustrates a flow chart of an exemplary process for transferring a file from an GTalk user to an OCS user, according to one embodiment.

FIG. 14 illustrates a flow chart of an exemplary process for transferring a file from an GTalk user to an OCS user, according to one embodiment. File transfer is handled by a hub and a file share server (FSS) as follows. When a GTalk sending user (GTalk SU) wants to send a file, a request is sent to the hub (at 1401) and processed by a FS as illustrated in FIG. 6. The hub relays the request to the receiving OCS user (OCS RU). Once the OCS RU accepts the request, an acceptance message is sent back through the hub to the GTalk SU (at 1402). The acceptance message is again processed by a FS as illustrated in FIG. 6. Next, both the GTalk SU and the OCS RU connect to the FSS via TCP (at 1403 and 1409, respectively). TCP is the common protocol over which UC specific protocols such as TFTP and HTTP are implemented.

After GTalk SU connects successfully to the FSS, the FSS sends to the GTalk SU an HTTP GET to request the file (at 1410). In response, the GTalk SU sends an HTTP Response (at 1411). After OCS RU connects successfully to the FSS, the OCS RU sends to the FSS a signal indicating the protocol that will be used (e.g., VER MSN_SECURE_FTP) (at 1404). The FSS replies to the OCS RU with the same string indicating the protocol (at 1405).

The OCS RU sends a USR signal to the FSS for authentication (at 1406). If the USR signal is valid, the FSS sends back to the OCS RU a FIL signal that indicates the file size (at 1407). Next, the OCS RU sends a TFR signal to the FSS (at 1408). Next, the GTalk SU sends the file to the FSS while the FSS sends the file to the OCS RU (at 1412). Because the OCS RU knows the file size, the OCS RU knows when a file has finished transferring and sends a BYE signal to the FSS indicating a complete transfer (at 1413). Next, the FSS sends a MAC signature to the OCS RU to check the transfer (at 1414). Finally, the FSS closes the connection with the OCS RU (at 1415) and the GTalk SU closes the connection with the FSS (at 1316).

Local Domain Configurations

In order for UC systems to communicate with each other through a hub, the local domain administrators of the UC systems need to properly configure their systems so that communications traffic intended for a receiving UC system is directed to the hub. For instance, in a clearinghouse or hub implementation, a domain gateway is typically implemented. The domain gateway is a component that allows the UC system to communicate with the hub. In order for a UC system to communicate with the hub, both the domain gateway and the UC system need to be configured properly.

Figure 15:
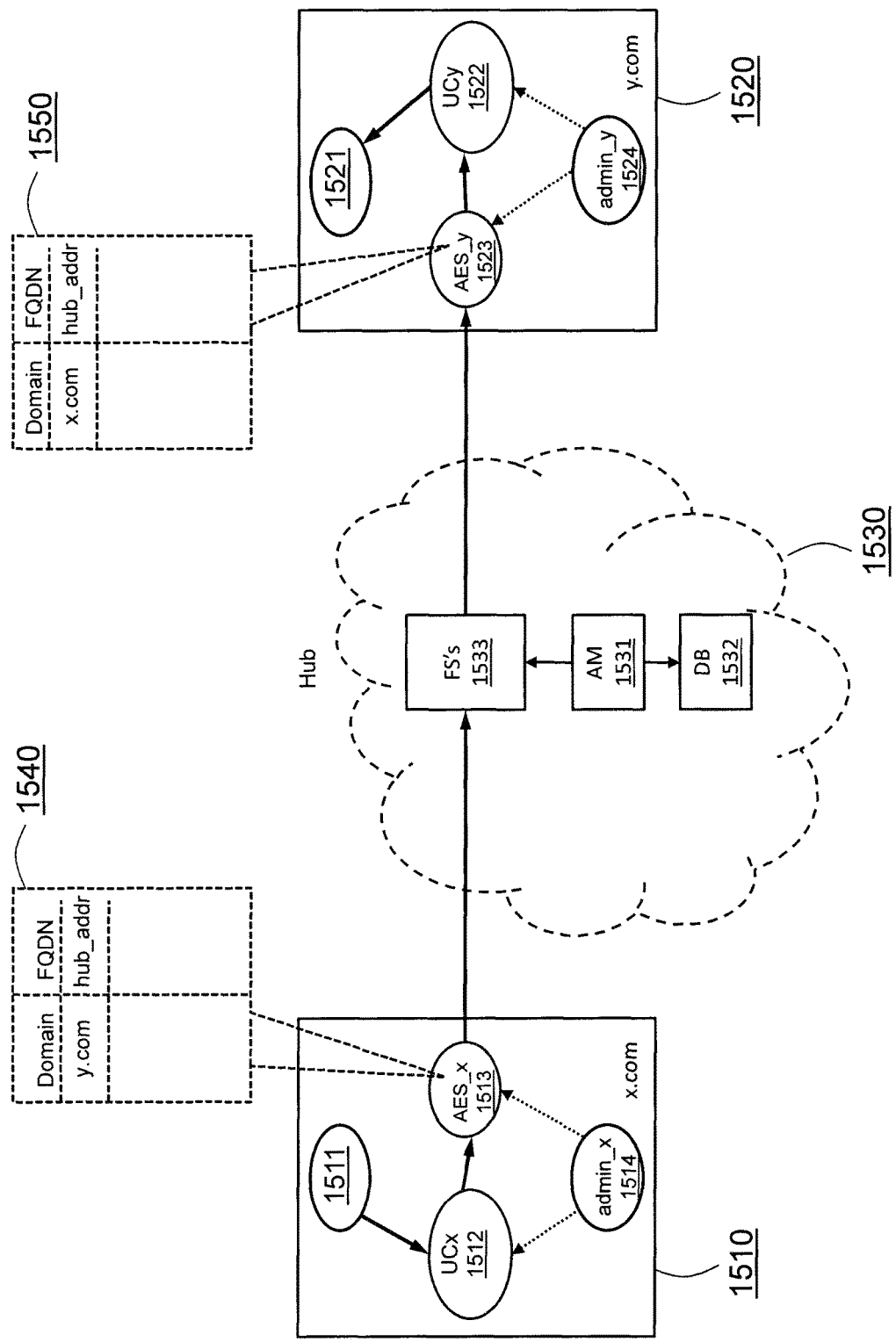
FIG. 15 illustrates a block diagram that traces an exemplary transmission of a message through a hub and domain gateways, according to one embodiment.

FIG. 15 illustrates a block diagram that traces an exemplary transmission of a message through a hub and domain gateways, according to one embodiment. Assume user 1511 wants to send a message to user 1521. User 1511 first sends the message to the local UC system 1512. The message is then forwarded to domain gateway 1513 (e.g., Access Edge Server (AES), Same Time Gateway, etc) which maintains an allow list 1540 of all the domains the local domain administrator 1514 has allowed its users to have access to. This way, local domain administrators have control over which domains its users can communicate with. Additionally, the allow list can be used allow or disallow communication with federated domains. Another useful function of the allow list is to provide UC address information for federated domains.

In order to route communications traffic that is intended for domain "y.com" (1520) to the hub 1530, the allow list 1540, specifically the FQDN field in the entry for domain "y.com" (1520), needs to include the address of the hub 1530 ("hub_addr"). Furthermore, the hub 1530 must also be properly configured by the hub administrator, who must add both domains ("x.com" and "y.com") to the hub 1530 through the AM 1531. Once the hub administrator has configured the AM 1531 and the AM 1531 has updated the data store in the DB 1532, the hub 1530 is ready for use and all traffic to and from "x.com" to "y.com" will flow through the hub 1530.

The routed traffic includes the message that was sent by 1511. After being processed by the hub 1530, the message is forwarded to domain gateway 1523, then to UC system 1522, and finally to user 1521. As FIG. 15 illustrates, the FQDN field in the entry for domain "x.com" in allow list 1550 also needs to include the address of the hub 1530 ("hub_addr"). As such, traffic intended for the domain "x.com" (1510) is also routed through the hub 1530.

Figure 16:
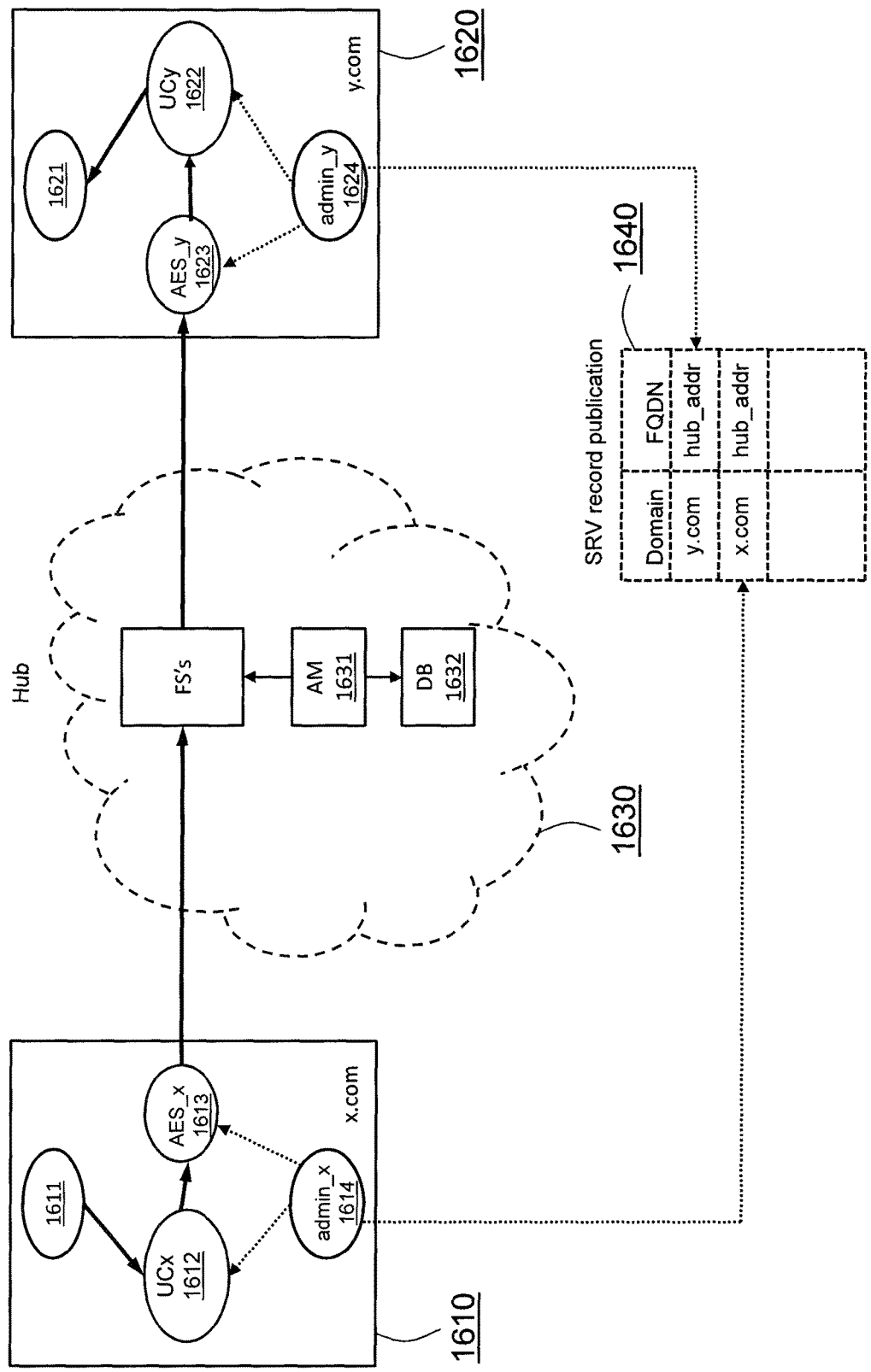
FIG. 16 illustrates a block diagram that traces an exemplary transmission of a message through a hub using Service (SRV) record publication, according to one embodiment.

FIG. 16 illustrates a block diagram that traces an exemplary transmission of a message through a hub using SRV record publication, according to one embodiment. Assume user 1611 wants to send a message to user 1621. User 1611 first sends the message to the local UC system 1612. Next, the message is sent to domain gateway 1613 and is intended to be transmitted to domain "y.com" (1620). However, because the local administrators 1614 and 1624 have published the SRV records for domains "x.com" (1610) and "y.com" (1620), respectively, with the FQDN fields set as "hub_addr", as shown in SRV record publication 1640, all communications traffic that is intended for domains "x.com" and "y.com" 1620 will be routed to the hub 1630. In order for the hub 1630 to handle the routed traffic, both domains ("x.com" and "y.com") need to be added to the hub 1630 through the AM 1631. As FIG. 16 illustrates, the routed traffic includes the message that was sent by 1611. After being processed by the hub 1630, the message is forwarded to the domain gateway 1623, then to the UC system 1622, and finally to user 1621.

SRV records enable a domain (e.g., foo.com) to become part of the hub without asking other domains to configure their gateways/allow lists to add the domain in order to direct traffic to the hub. Accordingly, using SRV records for multiple protocols along with the support for those multiple protocols in the hub enable a domain (e.g., foo.com) to appear as different UC systems. For instance, by publishing an SRV record for the respective protocol, foo.com may appear as an OCS system to other OCS partners, and at the same time, foo.com may appear as a XMPP system to XMPP partners.

The SRV record requirement varies among UC systems based on the UC protocol used by the UC system or even within that UC protocol a vendor may have a specialized SRV record requirement. A feature of the hub is that the administrator of a domain (e.g., "y.com") can publish SRV records for all the UC system types that can federate (via the hub) with the domain (e.g., "y.com"). All these SRV records would point to the address for the hub (e.g., "hub.addr"). For instance, if "x.com" is an OCS UC system, then it would look up_sipfederationtls._tcp.y.com to federate with "y.com". If "z.com" is a Jabber UC system, then it would look up_xmpp-server._tcp.y.com to federate with "y.com". While "y.com" is a certain UC type (e.g., Sametime) but because of the SRV record publication and the hub, "y.com" appears as an OCS UC system to "x.com" and as a Jabber UC system to "z.com".

Media Call Processing

According to one embodiment, the present system supports a media call between clients of two UC systems (e.g., between LYNC®/OCS and GOOGLE®) that support federated media calls. The present system further supports a conferencing call where a client of a first UC system invites a client of a second UC system using a native multipoint control unit (MCU). In one embodiment, the present system supports a media call across different types of UC systems that are interconnected together using a hub system. In another embodiment, the present system supports a conferencing call between UC systems that are interconnected together using a hub system.

According to one embodiment, the present system provides a media call between clients of two UC systems using a browser that supports web real-time communication (WebRTC). A calling client (herein referred to as a "caller") on an originating UC system (e.g., LYNC) makes a media call to a federated callee client (herein referred to as a "callee") on a destination UC system that does not support federated media calls. The present system directs the callee to the browser on the callee client to accept the media call from the caller.

According to one embodiment, the present system allows a caller that supports federated media calls (e.g., LYNC® and GOOGLE®) to initiate/participate in/end a media call to a callee from the originating UC system. The present system provides the callee with a specified uniform resource locator (URL) in a browser to accept the call from the caller. In one embodiment, the present system does not have to provide an indication to the caller that the callee has accepted the call in the browser.

The present system further allows a caller that supports federated media calls to initiate a conference call to one or more callees using a MCU. The present system allows the caller to invite callees to join the conference call. The callees may support or may not support the federated conference call. If a callee does not support federated media calls, the present system provides an invitation request to the callee, where the invitation request includes a message with a specified URL to direct the callee to join the conference call.

According to one embodiment, the present system allows a caller that does not support federated media calls to initiate a media call to a callee. In one embodiment, the present system allows a caller to initiate a media call to a callee by using an automated application on an automation platform. The automated application includes a chat address that provides a chat endpoint for communication between the automated application and a user on a client of a UC system. A user on a caller initiates a chat session by adding a chat address of the automated application to his/her contact list and types an initial greeting (e.g., login, join, and hello) to the automated application. The automated application provides a specific URL to a browser to the callee. In another embodiment, the present system allows a caller to initiate a media call using a web portal of the present system. The caller registers/logs in to the web portal and initiates the media call on the browser of the web portal.

The present system further allows a caller that does not support federated media calls to initiate a conference call to one or more callees using an MCU. If the callee supports federated media calls, the present system provides an invitation request to the callee to accept and participate in the conference call using the callee client of a destination UC system. If the callee does not support federated media calls, the present system provides an invitation request to the callee, where the invitation request includes a message with a specified URL to a browser to join the conference call. According to one embodiment, the present system further provides a conferencing feature such as screen sharing to the caller and callee(s) in the conference call.

According to one embodiment, the present system allows a callee that supports federated media calls to accept the media call using the callee client of the destination UC system. According to another embodiment, the present system directs a callee that does not support federated media calls to a browser to accept the media call.

Figure 17:
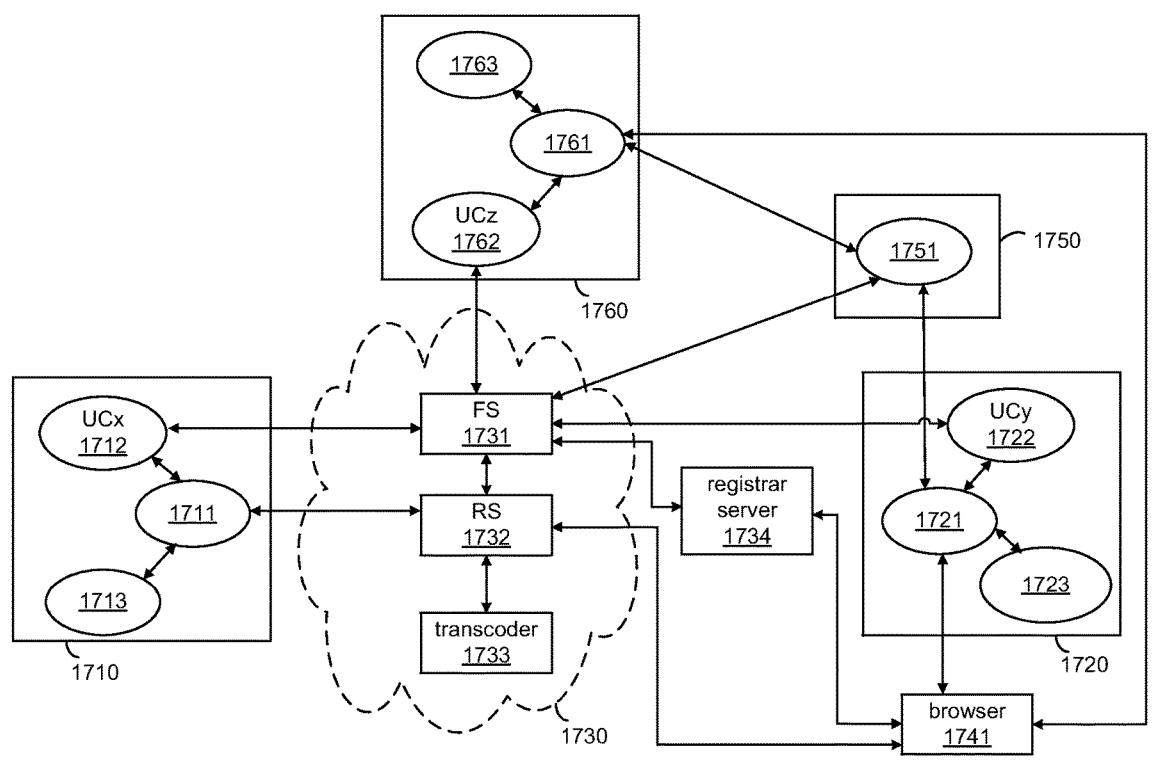
FIG. 17 illustrates a block diagram of an exemplary system for processing real-time media traffic such as audio and video traffic, according to one embodiment.

FIG. 17 illustrates a block diagram of an exemplary system for processing real-time media traffic such as audio and video traffic, according to one embodiment. Clients 1711, 1721, and 1761 communicate with each other through their respective UC systems UCx 1712, UCy 1722, and UCz 1762 using a hub 1730. While FIG. 17 illustrates only three UC systems 1712, 1722, and 1762, the present system can interconnect and support any number of UC systems without deviating from the scope of the present disclosure. The UC system UCx 1712 supports federated media calls while the UC systems UCy 1721 and UCz 1761 do not support federated media calls. The hub 1730 includes a federation server (FS) 1731, a relay server (RS) 1732, and a transcoder 1733.

The FS 1731 processes messages received from UC systems (e.g., UCx 1712 and UCy 1722), such as illustrated in FIG. 6. The RS 1732 processes media traffic such as audio and video traffic between the clients 1711 and 1721. For example, when the client 1711 initiates a media call to the client 1721, the FS 1731 determines that a media call initiate message has been received and sends control signals to the RS 1732 to engage and control certain operations of the RS 1732. The control signals include start-call, end-call, and caller/callee information such as media endpoint candidates and media codecs that are available to the caller and callee. In one embodiment, the FS 1731 sends a session request to the RS 1732 to allocate a session and retrieves a key (e.g., a call ID) of the session from the RS 1732. In another embodiment, the FS 1731 determines whether the clients 1711 and 1721 have a common media codec. If there is a common media codec, the FS 1731 updates the RS 1732 regarding the common media codec and determines that no transcoding is required using the transcoder 1733. The RS 1732 relays media traffic between the clients 1711 and 1721. The media traffic originating from the client 1711 flows as follows:

client 1711→RS 1732→browser 1741→client 1721

Similarly, media traffic originating from client 1721 flows as follows:

client 1721→browser 1741→RS 1732→client 1711

If there is no common media codec available to the clients 1711 and 1721, the FS 1731 updates the RS 1732 regarding the media codec used for both the clients 1711 and 1721, and determines that the media codec requires transcoding using the transcoder 1733. The RS 1732 engages the transcoder 1733 to transcode the media traffic from one codec format (e.g., a codec format used by the client 1711) to another codec format (e.g., a codec format used by the client 1721) and vice versa. In a case when transcoding is required, media traffic originating from the client 1711 flows as follows:

client 1711→RS 1732→transcoder 1733→RS 1732→browser 1741→client 1721

Similarly, media traffic originating from the client 1721 flows as follows:

client 1721→browser 1741→RS 1732→transcoder 1733→RS 1732→client 1711

The RS 1732 supports messages between FS 1731 and RS 1732 including, but not limited to, a request to add a candidate, a request to set a final candidate, a message to get a final candidate, a message to retrieve a stored state, a request to end a call, and a request for codec information. For example, a request to add a session description protocol (SDP) can be used to communicate the following information about one of the media endpoints to RS 1732:
  i. Audio/Video codecs supported
  ii. DTLS certificate information and fingerprints
  iii. SSRC range
  iv. Media direction (sendrecv, sendonly, recvonly, inactive)
  v. ICE candidates Similarly, a request to add candidates can be used to add additional ICE candidates; a message to get a final candidates can be used to get the candidates which are selected for the call after ICE negotiation; an end call request can be used to notify the RS 1732 that the call has ended based on the signaling received by FS 1731; and a request to set final candidates can be used if the signaling layer sent the final candidates sent it back to RS 1732.

The RS 1732 provides data structures including, but not limited to, a candidate information data structure, a media type data structure, a component type data structure, a peer type data structure, a component data structure, a component data structure, a media stream data structure, a peer endpoint data structure, a media call data structure. For example, the data structure RTCSDP can contain the media descriptions for audio and media streams. The data structure RTCMediaDesc can contain codes, DTLS information, media direction, list of ICE candidates, and SSRC range. The data structures are stored in the memory for the duration of a call. The media call objects (data structures) are stored in a hash map of the RS 1732 using a call ID as a key.

The transcoder 1733 receives control signals from the RS 1732 regarding the media endpoints (e.g., RTP and RTCP ports) and the codec formats of both the clients 1711 and 1712. The transcoder 1733 performs transcoding between various codec formats, including, but not limited to:

H263↔H264

Lync H264↔VP8

Lync H264↔H264 (Jabber Video)

H264 (Jabber Video)↔VP8

Lync H264↔Google H264

According to one embodiment, the transcoder 1733 is a part of the RS 1732 or can be implemented in a separate hardware component.

A registrar server 1734 provides an identity of a user of client 1721 that accepts a media call from the browser 1741. For example, the registrar server 1734 is an XMPP server such as Ejabberd (an XMPP application server) or OPENFIRE® (a real time collaboration (RTC) server). The FS 1731 does not require a connector to process a message from the browser 1741. According to one embodiment, the registrar server 1734 registers an independent user from an organization without a UC system. The independent user from such organization can register and use the registrar server 1734 through his/her browser. The registrar server 1734 provides an identity for the independent user and provides direct connectivity to a federated UC system (e.g., the UC systems 1712 and 1722).

The registrar server 1734 supports three types of media calls:
1. a caller that supports federated media calls calling a callee that does not support federated media calls;
2. a caller that does not support federated media calls calling a callee that supports federated media calls; and
3. a caller that does not support federated media calls calling a callee that does not support federated media calls The registrar server 1734 supports three types of users on a client of a user system: (1) a guest UC user (herein referred to as a "GUEST"); (2) a UC user with a temporary identity (herein referred to as a "UC_TEMP"); and (3) a UC user with a permanent identity (herein referred to as a "UC_PERM"). According to one embodiment, a user 1723 on the client 1721 is a GUEST. The registrar server 1734 provides a guest identifier (e.g., webrtc_id) to the GUEST user 1723. A user 1713 on the client 1711 may initiate a media call to the GUEST user 1723 via the FS 1731 by addressing the media call to the guest identifier. The registrar server 1734 may include an authentication module that is configured to allow the GUEST user 1723 to login using the guest identifier. For example, the registrar server 1734, which is an XMPP server, can include the anonymous authentication mechanism as supported by most XMPP servers.

The anonymous authentication mechanism consists of a single message from the client 1721 to the registrar server 1734. In this message, the client 1721 may include trace information in the form of a string of characters. The trace information, which has no semantical value, can take one of two forms: an Internet email address or an opaque string that does not contain the '@' character, which can be interpreted by the system administrator of the client's domain 1721. For privacy reasons, an Internet email address or other information identifying the GUEST user 1723 are used with permission from the GUEST user 1723. The registrar server 1734 may delete the guest identifier after the media call ends.

According to one embodiment, the user 1723 on the client 1721 is a UC_TEMP. The UC_TEMP user 1723 has a user identifier (e.g., uc_id) with the UC system UCy 1722, but is not a registered user of the registrar server 1734. The client 1721 does not support federated media calls natively (i.e., using the client 1721). For example, the UC_TEMP user 1723 has a user identity such as an address user1@foo.com where the domain name of the UC system UCy 1722 is foo.com. When the user 1713 on the client 1711 initiates a media call to the UC_TEMP user 1723's user identity user1@foo.com, the FS 1731 determines that the UC_TEMP user 1723 cannot accept a media call directly on the client 1721. The FS 1731 sends a URL containing a session identifier (e.g., session_id) of the media call as a message (e.g., an IM message) to the UC_TEMP user 1723 and stores the incoming call information. In some embodiments, incoming call information is an Audio/Video INVITE message which can either be a SIP or a XMPP message. In such embodiments, however, the INVITE message contains a session description protocol (SDP).

Next, the UC_TEMP user 1723 clicks on the URL to automatically log in to the registrar server 1734 using the user identity user1@foo.com. The registrar server 1734 provides a temporary identity to the UC_TEMP user 1723. By way of example only, such temporary identities are randomly generated. After receiving the temporary identity, the UC_TEMP user 1723 sends a XMPP IQ Packet (called as the READY packet) addressed to the FS 1731, which is forwarded by the registrar server 1734. The registrar server 1734 also sends a message containing the session identifier to the FS 1731 to indicate that the UC_TEMP user 1723 is ready to accept the media call.

FS 1731 on receiving the READY packet makes the association between the temporary identity user1_foo.com@guestuc.com to the user identity user1@foo.com and forwards the media call to the temporary identity user1_foo.com@guestuc.com. Accordingly, the FS 1731 rewrites the UC_TEMP user 1723's user identity with the temporary identity to flow the media call between the clients 1711 and 1721 through the registrar server 1734.

For example, for a Lync to Sametime call, it is assumed that the Lync user id is luser1@lync.com, the Sametime user id is suser1@st.com and the temporary identity of the suser1@st.com is anon123@guestuc.com. In this exemplary case, Sametime does not support federated media calls natively. When the user luser1@lync.com from Lync initiates a media call, the FS 1731 sends a URL containing a session identifier of the media call as an IM message (e.g. an Audio/Video INVITE message) to suser1@st.com and stores the IM message (e.g. INVITE message). The URL also contains the user identity of the Sametime user. Next, when the user invokes the URL in the browser, a Ready packet is sent to FS 1731 via the registrar server 1734 which contains the call id, user identity and the temporary identity.

Accordingly, the FS 1731 rewrites the Sametime user's user identity suser1@st.com with the temporary identity anon123@guestuc.com to flow the media call between the clients Lync and Sametime through the registrar server 1734.

According to one embodiment, the present system allows the UC_TEMP user 1723 to register on the registrar server 1734 with a portal on the browser 1741, for a permanent identity after the media call ends. The UC_TEMP user 1723 uses his/her user identity with the UC system UCy 1722 to register with the portal on the registrar server 1734.

According to one embodiment, the user 1723 on the client 1721 is a UC_PERM. The UC_PERM user 1723 is a registered user of the portal on the registrar server 1734. The client 1721 does not support federated media calls. When the UC_PERM user 1723 registers with the portal on the registrar server 1734, the registrar server 1734 allocates a permanent identity to the UC_PERM user 1723 and creates a mapping between the UC_PERM user 1723's user identity and the permanent identity. The registrar server 1734 stores the mapping information in a database that can be accessed by the FS 1731.

When the client 1711 initiates a media call to the UC_PERM user 1723's user identity, the FS 1731 checks the database of the registrar server 1734 for an available mapping. If there is no mapping in the database, the FS 1731 sends a URL to the user identity (as in the case for UC_TEMP). If there is a mapping between the user identity and a permanent identity in the database and there is an indication that the UC_PERM user 1723 is online, the FS 1731 rewrites the user identity to the permanent identity and forwards the call to the permanent identity. In this case, the user's presence in the registrar server is used to determine if the user is online. This ensures that the RS 1732 routes media traffic properly between the caller client 1711 and the callee client 1721. If there is an indication that the UC_PERM user 1723 is not online, the FS 1731 sends a URL to the user identity (as in the case for UC_TEMP). If the UC_PERM user 1723 clicks on the URL, the browser directs the UC_PERM user 1723 to login with his/her permanent identity to accept the call.

According to one embodiment, the UC_PERM user 1723 on the client 1721 initiates a media call to a callee. The callee may or may not support federated media calls. When the FS 1731 receives a media call initiate message from the UC_PERM user 1723, the FS 1731 checks the database of the registrar server 1734 for a mapping between the permanent identity and the user identity. If there is a mapping between the permanent identity and the user identity, the FS 1731 rewrites the permanent identity to the user identity. If the callee (e.g., the client 1711) supports federated media calls, the FS 1731 forwards the call natively to the callee client. If the callee (e.g., the client 1761) does not support federated media calls, the FS 1731 sends a URL to the callee.

According to one embodiment, the UC_PERM user 1723 initiates a media call by communicating with an automated application 1751 on an automation platform 1750 via the client 1721. The automated application 1751 includes a chat address (e.g., webrtc@bot.nextplane.com) that provides a chat endpoint for communication between the automated application 1751 and the UC_PERM user 1723. The UC_PERM user 1723 initiates a media call to a callee (e.g., the clients 1711 and 1761) by initiating a multi-user chat (MUC) session between the automated application 1751 and the callee. The automated application 1751 receives the invitation from the UC_PERM user 1723 to initiate the MUC session with the callee and further receives a list of participants in the MUC session including the callee.

If the UC_PERM user 1723 on the client 1711 initiates a media call to the client 1761 that does not support federated media calls, the automated application 1751 sends a specified URL to a browser to the client 1711 and the client 1761. If the UC_PERM user 1723 on the client 1711 initiates a media call to the client 1711 that supports federated media calls, the automated application 1751 communicates with the FS 1731 that forwards the media call natively to the client 1711. If the UC_PERM user 1723 initiates an MUC between the automated application 1751 and two or more callees, the automated application 1751 sends a specified URL that supports a multi-party conference to the client 1721 and the two or more callees.

According to one embodiment, the FS 1731 connects to the registrar server 1734 using a connector. For example, the registrar server 1734 can use a standard XMPP connector to communicate with the XMPP based UC's or a Server to Server (S2S) connector. If the client 1711 initiates a call to the client 1721, the FS 1731 stores a session description protocol (SDP) from the client 1711 until the user 1723 of client 1721 is online to access the URL to initiate the browser 1741. In some embodiments, SDP is used to convey media details, transport addresses, and other session description metadata.

The client 1721 sends a READY packet to the FS 1731 to indicate that the client 1721 is ready to accept the call. When the FS 1731 receives the READY packet, the FS 1731 sends the stored SDP as a media call to the browser 1741. The browser 1741 notifies the client 1721 of the incoming call from the client 1711 and allows the user 1723 on the client 1721 to accept or reject the call. For example, the browser 1741 provides a ringing tone or a display of an incoming call on a user interface. If the user 1723 accepts the media call, the browser 1741 sends the packets (e.g., Jingle packets) to the FS 1731. By way of example only, the Jingle Packets in XMPP protocol can be the equivalent of SDP in SIP protocol. The FS 1731 translates the packets appropriately and notifies the client 1711 and the RS 1732. It is understood that the client 1711 can also initiate a media call to the client 1761 using the above method without deviating from the scope of the present disclosure.

According to one embodiment, the browser 1741 is a web application using hypertext markup language (HTML) and JavaScript. The web application allows a user (e.g., users 1713, 1723, and 1763) on a client (e.g., the clients 1711, 1721, and 1761) to accept a media call in the browser 1741. The browser 1741 further allows the user to register with the registrar server 1734. The browser 1741 provides authentication as a client automatically to the registrar server 1734. By way of example only, in the current embodiment, the user provides the webrtc_id and password to login for UC_PERM. For UC_TEMP and GUEST, the registrar provides an anonymous webrtc_id which does not require authentication information.

Next, the browser 1741 uses an application programming interface (API) (e.g., WebRTC API) to collect candidates (e.g. SDP) and transport the collected candidates as data packets in an application format (e.g., Jingle packets) to the registrar server 1734. The registrar server 1734 forwards the data packets to the FS 1731. The browser 1741 further accepts data packets (e.g., Jingle packets) and translates the data packets using the API (e.g., WebRTC API). According to one embodiment, the URL on the browser 1741 is served from a web component of the registrar server 1734 or the FS 1731.

Figure 18:
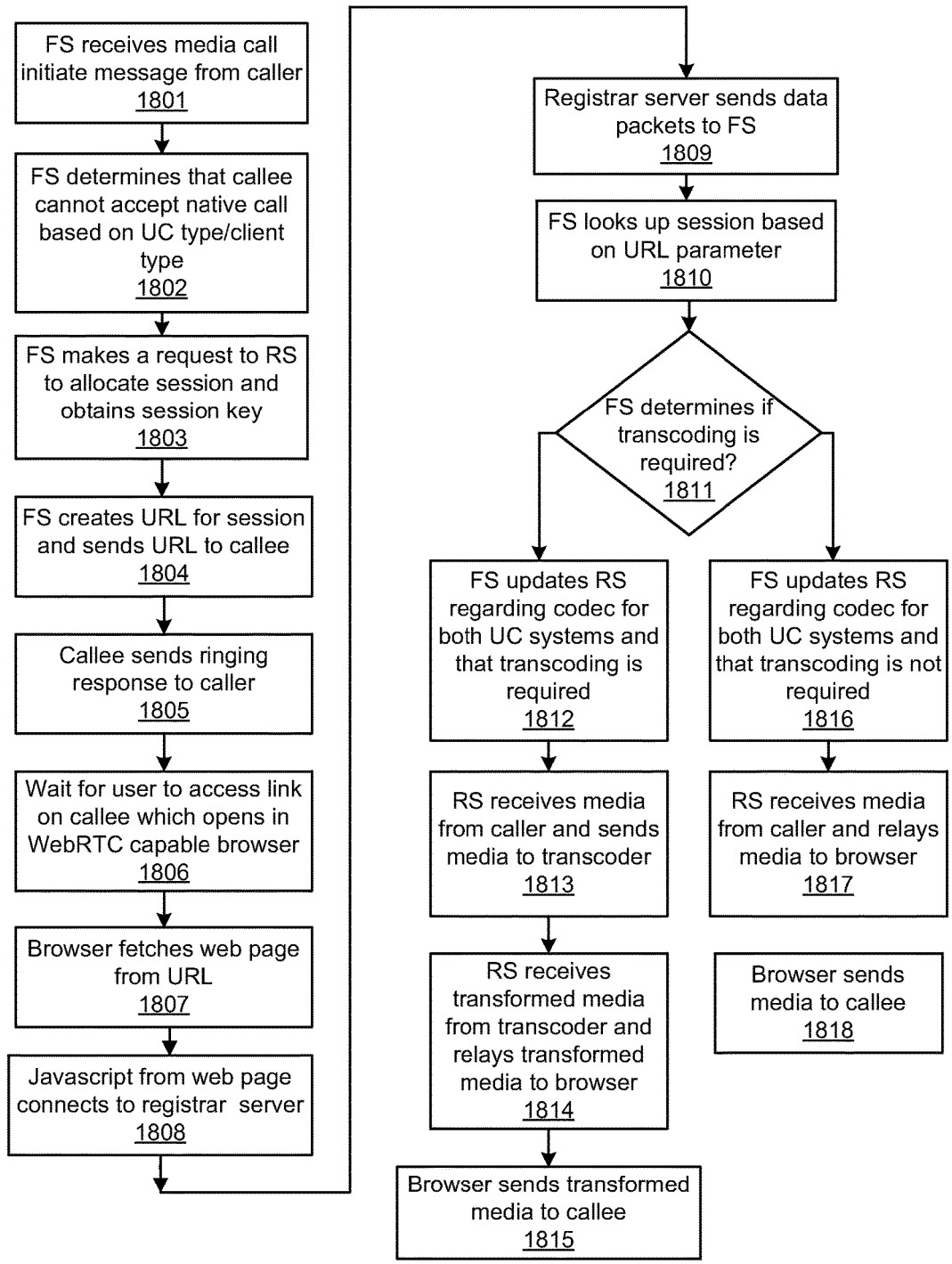
FIG. 18 illustrates a flow chart of an exemplary process for processing a media call, according to one embodiment.

FIG. 18 illustrates a flow chart of an exemplary process for processing a media call, according to one embodiment. A federation server (FS) receives a media call initiate message from a caller of an originating UC system (at 1801). The media call initiate message includes a request to initiate a voice/video call with a callee of a destination UC system. The FS determines that the callee cannot accept a native call on the callee of the destination UC system based on the UC type of the destination UC system and/or the client type (e,g. Lync, OCS and the like) of the callee (at 1802). The client type can change depending on application.

The FS makes a request to a relay server (RS) to allocate a session for the call and receives a session identifier of the session from the RS (at 1803). For example, the session identifier is a call ID. The FS creates a URL for the session and sends the URL to the callee (at 1804). The FS sends the URL to the callee as an instant messaging (IM) message, according to one embodiment. The session identifier and the callee address are further encoded in the URL. For example, in one embodiment, JSON representation of session identifier and the callee address is Base64 encoded so it can be used as a URL parameter.

The callee sends a ringing response to the caller via a signaling protocol (e.g., the SIP protocol) (at 1805). The ringing response indicates an acknowledgement that the callee has received the media initiate message and is notified of the call from the caller. For example, the ringing response is a 180 ringing response from a list of SIP response codes.

The FS waits for a user on the callee of the destination UC system to access the URL on the callee which opens in a WebRTC capable browser (at 1806). The browser fetches a web page from the URL (at 1807). The web page contains a JavaScript that makes a client connection to the registrar server using a transport protocol (e.g., bidirectional-streams over synchronous HTTP (BOSH) and WebSocket) (at 1808). In one embodiment, the JavaScript makes an XMPP client connection to the registrar server that uses the XMPP C2S protocol. According to one embodiment, the JavaScript translates the WebRTC session description protocol (SDP) to Jingle data packets or vice-versa and sends the data packets to the registrar server before forwarding the data packets to the FS. In other words, in some embodiments, the browser includes the Webrtc capability which is exposed through a Javascript API. The application javascript uses these APIs, to collect the SDP information (also called signaling information) for the endpoint and converts to Jingle so that it can be sent to the FS through the registrar server.

The registrar server forwards the data packets to the FS (at 1809). The FS looks up the session based on a URL parameter that is received from the registrar server (at 1810). For example, in one embodiment, a JSON representation of a session identifier and the callee address is Base64 encoded so it can be used as a URL parameter. The FS uses the previously allocated relay IP/port by RS and sends the relay IP/port to the browser to start the ICE/STUN negotiation. The FS server sends an acknowledgement response to the originating UC system. The acknowledgement response indicates acknowledgment of a successful request. For example, the acknowledgement response is a 200 OK response from a list of hypertext transfer protocol (HTTP) response status codes.

At the end of the SDP negotiation, the FS determines if transcoding is required (at 1811). If transcoding is required, the FS updates the RS regarding the codec for both the originating UC system and the destination UC system, and further updates the RS that transcoding is required (at 1812).

The RS receives the media call from the caller and sends the media traffic to the transcoder for codec transformation (at 1813). It is noted that the transcoder can provide any form of real-time transport protocol (RTP) transformation without deviating from the scope of the present disclosure. The RS receives the transformed media traffic from the transcoder and relays the transformed media traffic to the browser (at 1814). The browser sends the transformed media traffic to the callee (at 1815).

If transcoding is not required, the FS updates the RS regarding the codec for both the originating UC system and the destination UC system, and further updates the RS that transcoding is not required (at 1816). The RS receives media traffic from the caller and relays the media traffic to the browser (at 1817). The browser sends the media traffic to the callee (at 1818).

FIG. 19A illustrates a flow chart of an incoming mode of an exemplary process for initiating a media call between various user types of a UC system, according to one embodiment. A federation server (FS) receives a media call initiate message from a caller of an originating UC system (at 1901). The media call initiate message includes a request to initiate a voice/video call with a callee of the destination UC system. The federation server (FS) determines if the callee supports a native call on the destination UC system based on the UC type of the destination UC system and/or the client type (e,g. Lync, OCS and the like) of the callee (at 1902). The client type can change depending on application.

If (at 1902) the federation server (FS) determines that the callee cannot accept a native call, the federation server (FS) then determines whether the callee identity maps to a permanent identity in a database (at 1903). If there is no mapping, the federation server (FS) authenticates the callee based on his/her static user identity (at 1904). The federation server (FS) sends a URL to the callee as a message to direct the callee to a browser to login with his/her permanent identity (at 1905). The federation server (FS) waits for the callee to be online (at 1906). The federation server (FS) authenticates callee's permanent identity when the callee logins (at 1907). The federation server (FS) forwards the media call to the permanent identity (at 1908).

If there is an available mapping, the federation server (FS) determines whether the callee is logged into the registrar server and the browser is open, which ensures the online status of the callee (at 1909). If the callee is online, the federation server (FS) rewrites the user identity of the callee to the permanent identity as indicated in the database (at 1910). The federation server (FS) forwards the media call to the permanent identity (at 1911).

If the user is not online, the federation server (FS) sends a URL to the callee as a message to direct the callee to the browser to login with his/her permanent identity (at 1912). The federation server (FS) waits for the callee to be online (at 1913). The federation server (FS) authenticates callee's permanent identity when the callee logins (at 1914). The federation server (FS) forwards the media call to the permanent identity (at 1915).

On the other hand, if (at 1902) the federation server (FS) determines that the callee can accept a native call, the process proceeds to 1916, where the process continues as shown in step 806 and onwards in FIG. 8.

FIG. 19B illustrates a flow chart of an outgoing mode of an exemplary process for initiating a media call between various user types of a UC system, according to one embodiment. A caller from an originating UC system logins to a portal using the caller's permanent identity in the database or a temporary identity (at 1917).The caller of the originating UC system then sends a media call request to the callee of the destination UC system (at 1918). The federation server (FS) receives a media call initiate message from the caller of the originating UC system (at 1919). The media call initiate message includes a request to initiate a voice/video call with a callee of a destination UC system. The federation server (FS) determines if the callee supports a native call on the destination UC system based on the UC type of the destination UC system and/or the client type (e,g. Lync, OCS and the like) of the callee (at 1920). The client type can change depending on application.

If (at 1920) the federation server (FS) determines that the callee cannot accept a native call, the federation server (FS) then determines whether the callee identity maps to a permanent identity in a database (at 1921). If there is no mapping, the federation server (FS) authenticates the callee based on his/her static user identity (at 1922). The federation server (FS) sends a URL to the callee as a message to direct the callee to a browser to login with his/her permanent identity (at 1923). The federation server (FS) waits for the callee to be online (at 1924). The federation server (FS) authenticates callee's permanent identity when the callee logins (at 1925). The federation server (FS) forwards the media call to the permanent identity (at 1926).

If (at 1921) there is an available mapping, the federation server (FS) determines whether the callee is logged into the registrar server and the browser is open, which ensures the online status of the callee (at 1927). If the callee is online, the federation server (FS) rewrites the user identity of the callee to the permanent identity as indicated in the database (at 1928). The federation server (FS) forwards the media call to the permanent identity (at 1929).

If the user is not online, the federation server (FS) sends a URL to the callee as a message to direct the callee to the browser to login with his/her permanent identity (at 1930). The federation server (FS) waits for the callee to be online (at 1931). The federation server (FS) authenticates callee's permanent identity when the callee logins (at 1932). The federation server (FS) forwards the media call to the permanent identity (at 1933).

On the other hand, If (at 1920) the federation server (FS) determines that the callee can accept a native call, the process proceeds to 1934, where the process continues as shown in step 806 and onwards in FIG. 8.

Figure 20:
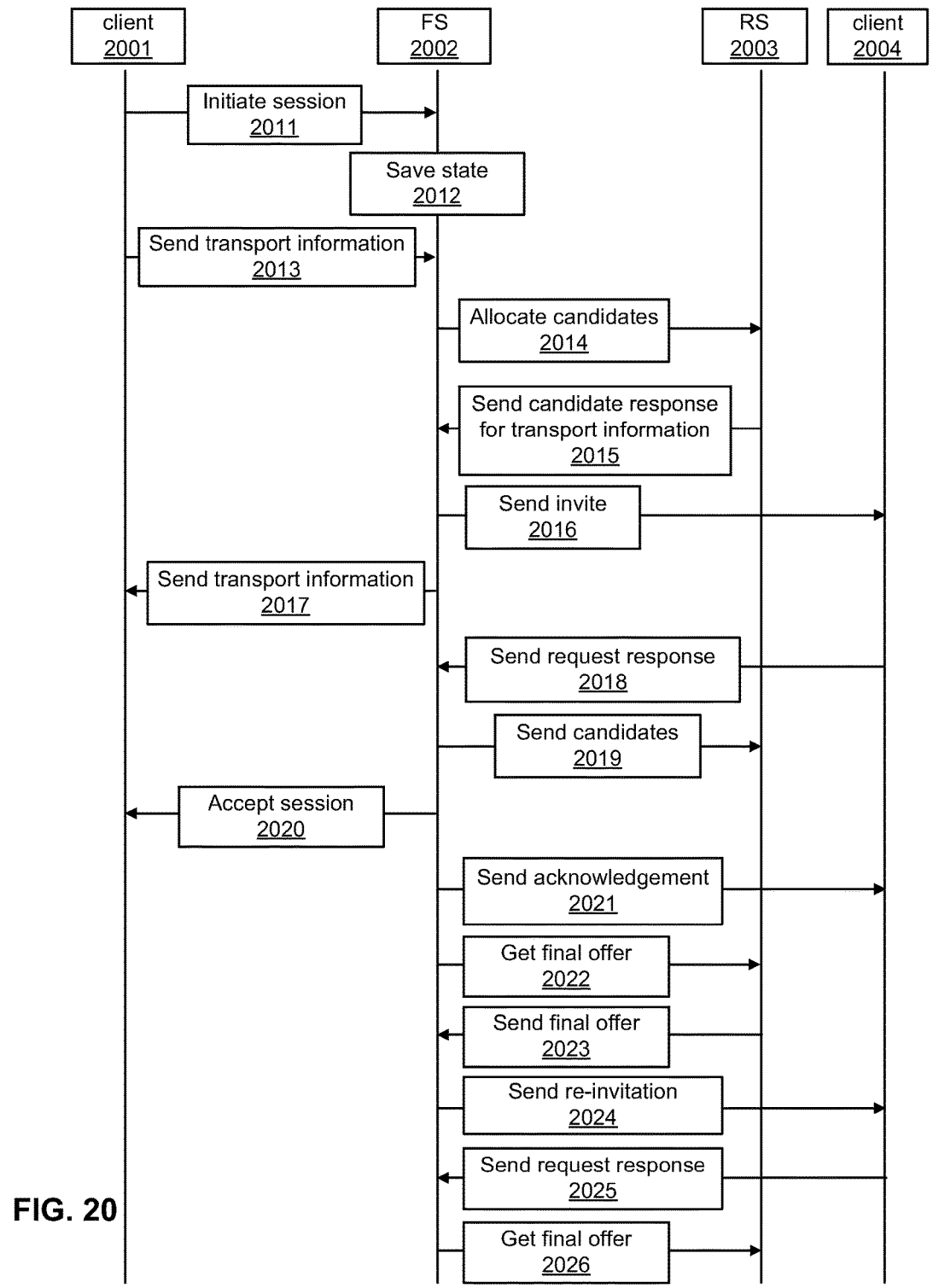
FIG. 20 illustrates an exemplary sequence diagram for initiating a media call between two clients of two respective UC systems that support federated media calls, according to one embodiment.

FIG. 20 illustrates an exemplary sequence diagram for initiating a media call between two clients of two respective UC systems that support federated media calls, according to one embodiment. A client 2001 initiates a media call session to a client 2004 by sending an initiate session message to a FS 2002 (at 2011). The FS 2002 saves a state of the media call session (e.g., caller information, callee information, and a session identifier) (at 2012). The client 2001 sends transport information (e.g. ICE candidates) to the FS 2002 (at 2013). The FS 2002 allocates caller candidates to a RS 2003 (at 2014). Caller candidates are IP addresses and ports at which the caller receives media traffic. The RS 2003 sends the FS 2002 a candidate response for the transport information (at 2015). The FS 2002 sends an invitation request for the media call session to the client 2004 (at 2016). The FS 2002 sends the transport information to the client 2001 (at 2017). The client 2004 sends the FS 2002 a response for a successful invitation request (e.g., a 200 OK response) (at 2018). The FS 2002 sends the caller candidates (i.e., for the client 2001) to the RS 2003 (at 2019).

The FS 2002 accepts the media call session (at 2020). The FS 2002 sends an acknowledgement to the client 2004 (at 2021). The FS 2002 gets a final offer (e.g. final candidate) from the RS 2003 (at 2022). The RS 2003 sends the final offer to the FS 2002 (at 2023). The FS 2002 sends a re-invitation to the client 2004 (at 2024) as a confirmation of the final offer. The client 2004 sends the FS 2002 a response for a successful invitation request (e.g., a 200 OK response) (at 2025). The FS 2002 sends the final offer to the RS 2003 (at 2026).

Figure 21:
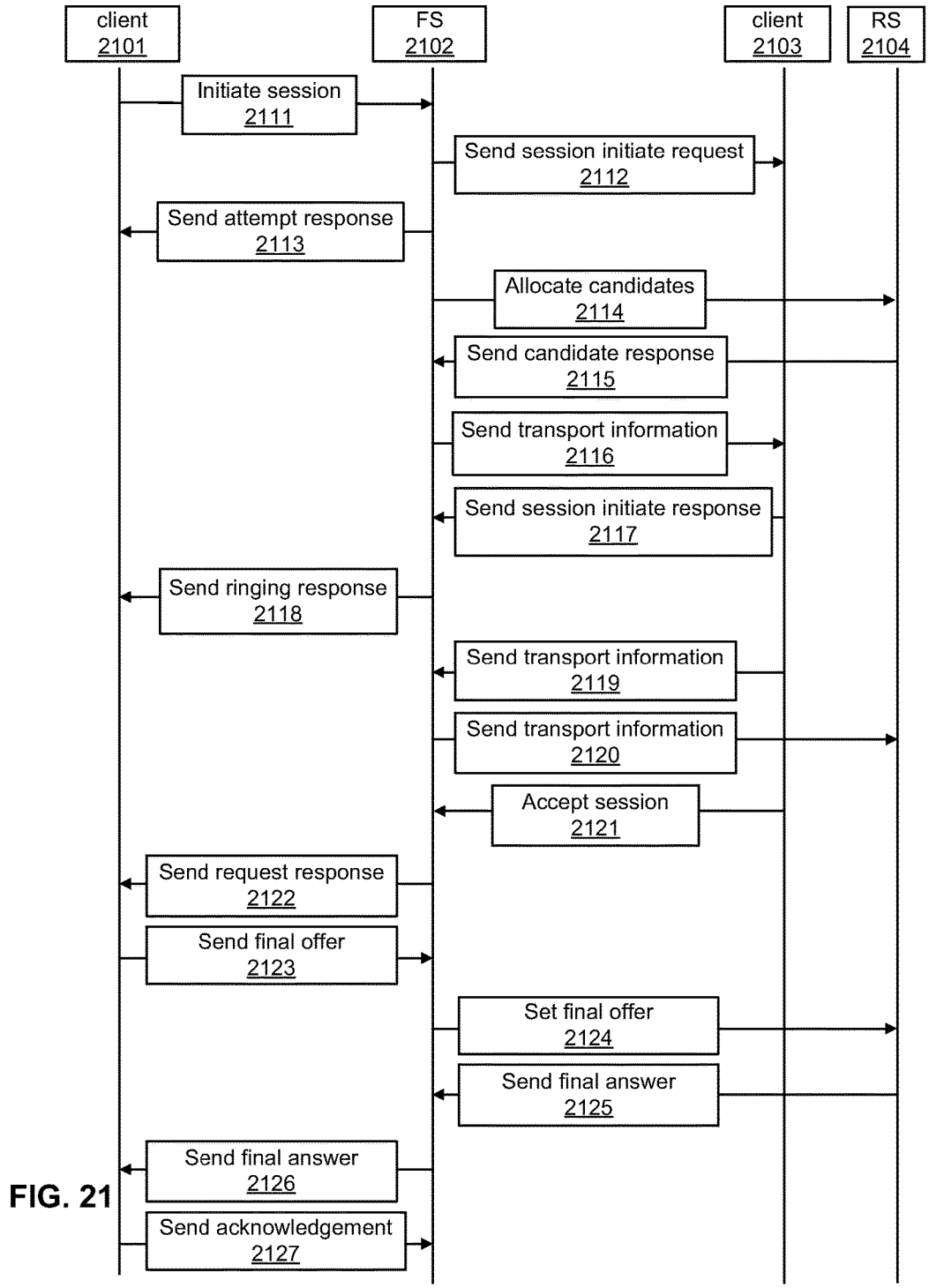
FIG. 21 illustrates another exemplary sequence diagram for initiating a media call between two clients of two respective UC systems that support federated media calls, according to one embodiment.

FIG. 21 illustrates another exemplary sequence diagram for initiating a media call between two clients of two respective UC systems that support federated media calls, according to one embodiment. A client 2101 initiates a media call session to a client 2103 by sending an initiate session message to a FS 2102 (at 2111). The FS 2102 sends a session initiation request to the client 2103 (at 2112). The FS 2102 sends an attempt response (e.g., a 100 Trying response) to the client 2101 (at 2113). The FS 2102 allocates caller candidates to the RS 2104 (at 2114). The RS 2104 sends a candidate response to the FS 2102 (at 2115). The FS 2102 sends transport information (e.g. ICE candidates) including callee candidates (i.e., for the client 2103) to the client 2103 (at 2116). The client 2103 sends the FS 2102 a session initiate response (at 2117). The FS 2102 sends a ringing response (e.g., a 180 Ringing response) to the client 2101 (at 2118). The client 2103 sends the transport information to the FS 2102 (at 2119). The FS 2102 sends transport information to the RS 2104 (at 2120).

The client 2103 provides a response for the session acceptance to the FS 2102 (at 2121). The FS 2102 sends the request response (e.g., a 200 OK response) to the client 2101 (at 2122). The FS 2102 further sends the stored caller candidates in the request response to the client 2101. The client 2101 sends a final offer (e.g. final candidate) to the FS 2102 (at 2123). The FS 2102 sets a final offer with the RS 2104 (at 2124). The RS 2104 sends a final answer to the FS 2102 (at 2125). The FS 2102 sends a response for a successful invitation request (e.g., a 200 OK response) that includes the final answer to the client 2101 (at 2126). The client 2101 sends an acknowledgement to the FS 2102 (at 2127).

Figure 22:
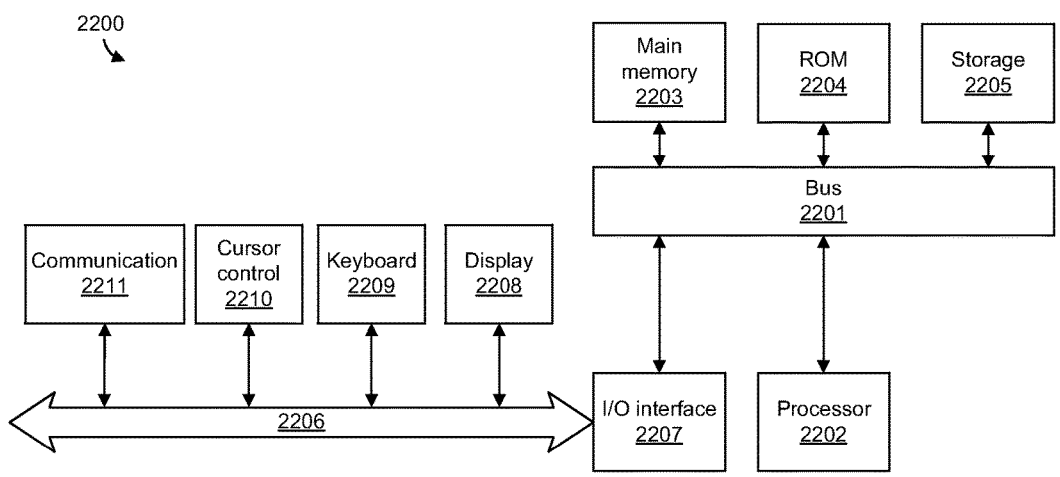
FIG. 22 illustrates an exemplary computer architecture that may be used for the present system, according to one embodiment.

FIG. 22 illustrates an exemplary computer architecture that may be used for the present system, according to one embodiment. The exemplary computer architecture may be used for implementing one or more components described in the present disclosure including, but not limited to, the present system. One embodiment of architecture 2200 includes a system bus 2201 for communicating information, and a processor 2202 coupled to bus 2201 for processing information. Architecture 2200 further includes a random access memory (RAM) or other dynamic storage device 2203 (referred to herein as main memory), coupled to bus 2201 for storing information and instructions to be executed by processor 2202. Main memory 2203 also may be used for storing temporary variables or other intermediate information during execution of instructions by processor 2202. Architecture 2200 may also include a read only memory (ROM) and/or other static storage device 2204 coupled to bus 2201 for storing static information and instructions used by processor 2202.

A data storage device 2205 such as a magnetic disk or optical disc and its corresponding drive may also be coupled to architecture 2200 for storing information and instructions. Architecture 2200 can also be coupled to a second I/O bus 2206 via an I/O interface 2207. A plurality of I/O devices may be coupled to I/O bus 2206, including a display device 2208, an input device (e.g., an alphanumeric input device 2209 and/or a cursor control device 2210).

The communication device 2211 allows for access to other computers (e.g., servers or clients) via a network. The communication device 2211 may include one or more modems, network interface cards, wireless network interfaces or other interface devices, such as those used for coupling to Ethernet, token ring, or other types of networks.

The above example embodiments have been described hereinabove to illustrate various embodiments of implementing a system and method processing media traffic for a hub-based system federating disparate unified communications systems. Various modifications and departures from the disclosed example embodiments will occur to those having ordinary skill in the art. The subject matter that is intended to be within the scope of the disclosure is set forth in the following claims.

We claim:

1. A system, comprising:
a federation server that includes a processor and is configured to connect to a first unified communications system and a second unified communications system,
wherein the federation server receives a media call initiation request from a first client of the first unified communications system, wherein the media call initiation request initiates a media call with a second client of the second unified communications system,
wherein the federation server provides a uniform resource locator to the second client based on the media initiation request, wherein the uniform resource locator is configured to direct a user on the second client to a browser to accept the media call,
wherein a registrar server is configured to connect to the browser and the federation server,
wherein the registrar server is configured to allow the user to register for a permanent identity on the registrar server, wherein the user has a user identity associated with the second communications system, and
wherein the registrar server comprises a database for storing association information between the user identity and the permanent identity.

2. The system of claim 1, wherein the uniform resource locator includes an identifier of the media call.

3. The system of claim 1, further comprising a registrar server that is configured to connect to the browser and the federation server, wherein the registrar server provides a temporary identity to the user, wherein the user has a user identity associated with the second communications system.

4. The system of claim 3, wherein the federation server rewrites the user identity to the temporary identity.

5. The system of claim 1, wherein the federation server rewrites the user identity to the permanent identity based on the association information.

6. The system of claim 5, wherein the federation server provides the media call to the permanent identity on the browser.

7. The system of claim 1, wherein the federation server determines media codec formats of the first client and the second client.

8. The system of claim 7, further comprising a relay server that is configured to be connected to the federation server and one or more of the first client and the browser,
wherein the relay server receives media traffic from the one or more of the first client and the browser, and
wherein the relay server receives the media codec formats of the first client and the second client from the federation server.

9. The system of claim 8, further comprising a transcoder that is configured to be connected to the relay server, wherein the transcoder transcodes the media traffic from the relay server based on the media codec formats.

10. The system of claim 1, further comprising an automation application that is configured to communicate with the first client, wherein the automation application provides the uniform resource locator to the second client.

11. A method, comprising:
connecting a first unified communications system and a second unified communications system through a federation server;
receiving into the federation server a media call initiation request from a first client of the first unified communications system, wherein the media call initiation request initiates a media call with a second client of the second unified communications system;
providing from the federation server a uniform resource locator to the second client based on the media initiation request, wherein the uniform resource locator is configured to direct a user on the second client to a browser to accept the media call;
connecting a registrar server to the browser and the federation server;
configuring the registrar server to allow the user to register for a permanent identity on the registrar server, wherein the user has a user identity associated with the second communications system; and
storing, by the register server in a database, association information between the user identity and the permanent identity.

12. The method of claim 11, wherein the uniform resource locator includes an identifier of the media call.

13. The method of claim 11, further comprising:
connecting a registrar server to the browser and the federation server; and
providing a temporary identity from the registrar server to the user, wherein the user has a user identity associated with the second communications system.

14. The method of claim 13, further comprising rewriting by the federation server the user identity to the temporary identity.

15. The method of claim 11, further comprising rewriting by the federation server the user identity to the permanent identity based on the association information.

16. The method of claim 15, further comprising providing by the federation server the media call to the permanent identity on the browser.

17. The method of claim 11, further comprising determining by the federation server media codec formats of the first client and the second client.

18. The method of claim 17, further comprising connecting a relay server to the federation server and one or more of the first client and the browser;
receiving by the relay server media traffic from the one or more of the first client and the browser; and
receiving by the relay server the media codec formats of the first client and the second client from the federation server.

19. The method of claim 18, further comprising connecting a transcoder to the relay server and transcoding by the transcoder the media traffic from the relay server based on the media codec formats.

20. The method of claim 11, further comprising providing an automation application that is configured to communicate with the first client, wherein the automation application provides the uniform resource locator to the second client.

* * * * *